US012750711B2

(12) United States Patent
Farag et al.

(10) Patent No.: US 12,750,711 B2
(45) Date of Patent: Sep. 29, 2026

(54) USER EQUIPMENT INITIATED REPORTING

(71) Applicant: Samsung Electronics Co., Ltd., Suwon-si (KR)

(72) Inventors: Emad Nader Farag, Flanders, NJ (US); Md. Saifur Rahman, Plano, TX (US); Eko Onggosanusi, Coppell, TX (US); Dalin Zhu, Allen, TX (US); Gilwon Lee, Mckinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/540,700

(22) Filed: Dec. 14, 2023

(65) Prior Publication Data

US 2024/0224101 A1 Jul. 4, 2024

Related U.S. Application Data

(60) Provisional application No. 63/535,924, filed on Aug. 31, 2023, provisional application No. 63/441,133, filed on Jan. 25, 2023, provisional application No. 63/436,017, filed on Dec. 29, 2022.

(51) Int. Cl.

*H04W 24/10* (2009.01)
*H04W 72/044* (2023.01)

(52) U.S. Cl.

CPC .......... *H04W 24/10* (2013.01); *H04W 72/046* (2013.01)

(58) Field of Classification Search

CPC ... H04W 24/10; H04W 72/046; H04W 72/23; H04W 24/08; H04W 72/1268; H04B 7/06952

USPC .......................................................... 370/252

See application file for complete search history.

(56) References Cited

U.S. PATENT DOCUMENTS

| | | | | |
|---|---|---|---|---|
| 2019/0296815 | A1* | 9/2019 | Onggosanusi | H04W 24/08 |
| 2021/0203449 | A1* | 7/2021 | Chatterjee | H04L 1/1896 |
| 2021/0314931 | A1* | 10/2021 | Farag | H04W 24/10 |
| 2022/0007299 | A1 | 1/2022 | Rahman et al. | |
| 2022/0173788 | A1 | 6/2022 | Kang et al. | |

(Continued)

OTHER PUBLICATIONS

"3rd Generation Partnership Project; Technical Specification Group Radio Access Network; NR; Physical channels and modulation (Release 18)", 3GPP TS 38.211 V18.0.0, Sep. 2023, 159 pages.

(Continued)

*Primary Examiner* — Nicholas A Jensen
*Assistant Examiner* — Oladiran Gideon Olaleye

(57) ABSTRACT

Methods and apparatuses for user equipment (UE) initiated reporting in a wireless communication system. A method of operating a UE includes receiving first information related to resources for a physical uplink shared channel (PUSCH); receiving second information related to (i) beam measurement resources and (ii) a beam report configuration; and receiving third information related to a condition to transmit a beam report; measuring the beam measurement resources. The method further comprises determining, based on the measurement and the condition, whether to transmit the beam report; in response to determining to transmit the beam report, determining the beam report based on the measurement; and transmitting, via a resource from the resources for the PUSCH, the beam report. The resource for the PUSCH is a Type 1 configured grant PUSCH resource.

20 Claims, 11 Drawing Sheets

(56) References Cited

U.S. PATENT DOCUMENTS

| | | | | |
|---|---|---|---|---|
| 2022/0210798 | A1* | 6/2022 | Tsai | H04L 5/0051 |
| 2022/0216904 | A1* | 7/2022 | Zhu | H04B 7/0695 |
| 2022/0322113 | A1 | 10/2022 | Zhang et al. | |
| 2022/0322480 | A1 | 10/2022 | Deenoo et al. | |
| 2022/0353707 | A1* | 11/2022 | Cirik | H04L 5/0048 |
| 2022/0377799 | A1 | 11/2022 | MolavianJazi et al. | |
| 2025/0150918 | A1* | 5/2025 | Löhr | H04W 36/085 |

OTHER PUBLICATIONS

"3rd Generation Partnership Project; Technical Specification Group Radio Access Network; NR; Multiplexing and channel coding (Release 18)", 3GPP TS 38.212 V18.0.0, Sep. 2023, 278 pages.
3rd Generation Partnership Project; Technical Specification Group Radio Access Network; NR; Physical layer procedures for control (Release 18), 3GPP TS 38.213 V18.0.0, Sep. 2023, 285 pages.
"3rd Generation Partnership Project; Technical Specification Group Radio Access Network; NR; Physical layer procedures for data (Release 18)", 3GPP TS 38.214 V18.0.0, Sep. 2023, 278 pages.
"5G; NR; Medium Access Control (MAC) protocol specification (3GPP TS 38.321 version 17.6.0 Release 17)", ETSI TS 138 321 V17.6.0, Oct. 2023, 255 pages.
"5G; NR; Radio Resource Control (RRC); Protocol specification (3GPP TS 38.331 version 17.6.0 Release 17)", ETSI TS 138 331 V17.6.0, Oct. 2023, 1309 pages.
International Search Report and Written Opinion issued Mar. 28, 2024 regarding International Application No. PCT/KR2023/021829, 7 pages.

* cited by examiner

USER EQUIPMENT INITIATED REPORTING

CROSS-REFERENCE TO RELATED APPLICATIONS AND CLAIM OF PRIORITY

The present application claims priority to:

U.S. Provisional Patent Application No. 63/436,017, filed on Dec. 29, 2022;

U.S. Provisional Patent Application No. 63/441,133, filed on Jan. 25, 2023; and

U.S. Provisional Patent Application No. 63/535,924, filed on Aug. 31, 2023.

The contents of the above-identified patent documents are incorporated herein by reference.

TECHNICAL FIELD

The present disclosure relates generally to wireless communication systems and, more specifically, the present disclosure relates to a user equipment (UE) initiated reporting in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to a UE initiated reporting in a wireless communication system.

In one embodiment, a UE is provided. The UE includes a transceiver configured to receive first information related to resources for a physical uplink shared channel (PUSCH), receive second information related to (i) beam measurement resources and (ii) a beam report configuration, and receive third information related to a condition to transmit a beam report. The UE further includes a processor operably coupled to the transceiver. The processor is configured to measure the beam measurement resources, determine, based on the measurement and the condition, whether to transmit the beam report, and in response to determining to transmit the beam report, determine the beam report based on the measurement. The transceiver is further configured to transmit, via a resource from the resources for the PUSCH, the beam report. The resource for the PUSCH is a Type 1 configured grant PUSCH resource.

In another embodiment, a base station (BS) is provided. The BS includes a transceiver configured to transmit first information related to resources for a PUSCH, transmit second information related to (i) beam measurement resources and (ii) a beam report configuration, transmit third information related to a condition to transmit a beam report, and receive, from a UE and via a resource from the resources for the PUSCH, a beam report, wherein the resource for the PUSCH is a Type 1 configured grant PUSCH resource. The BS further includes a processor operably coupled to the transceiver. The processor is configured to determine whether the beam report has been received, and when the beam report is determined to be received, configure the UE based on the beam report.

In yet another embodiment, a method of operating a UE is provided. The method includes receiving first information related to resources for a PUSCH; receiving second information related to (i) beam measurement resources and (ii) a beam report configuration; and receiving third information related to a condition to transmit a beam report; measuring the beam measurement resources. The method further comprises determining, based on the measurement and the condition, whether to transmit the beam report; in response to determining to transmit the beam report, determining the beam report based on the measurement; and transmitting, via a resource from the resources for the PUSCH, the beam report. The resource for the PUSCH is a Type 1 configured grant PUSCH resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v18.0.0, "NR; Physical channels and modulation"; 3GPP TS 38.212 v18.0.0, "NR; Multiplexing and Channel coding"; 3GPP TS 38.213 v18.0.0, "NR; Physical Layer Procedures for Control"; 3GPP TS 38.214 v18.0.0, "NR; Physical Layer Procedures for Data"; 3GPP TS 38.321 v17.6.0, "NR; Medium Access Control (MAC) protocol specification"; and 3GPP TS 38.331 v17.6.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
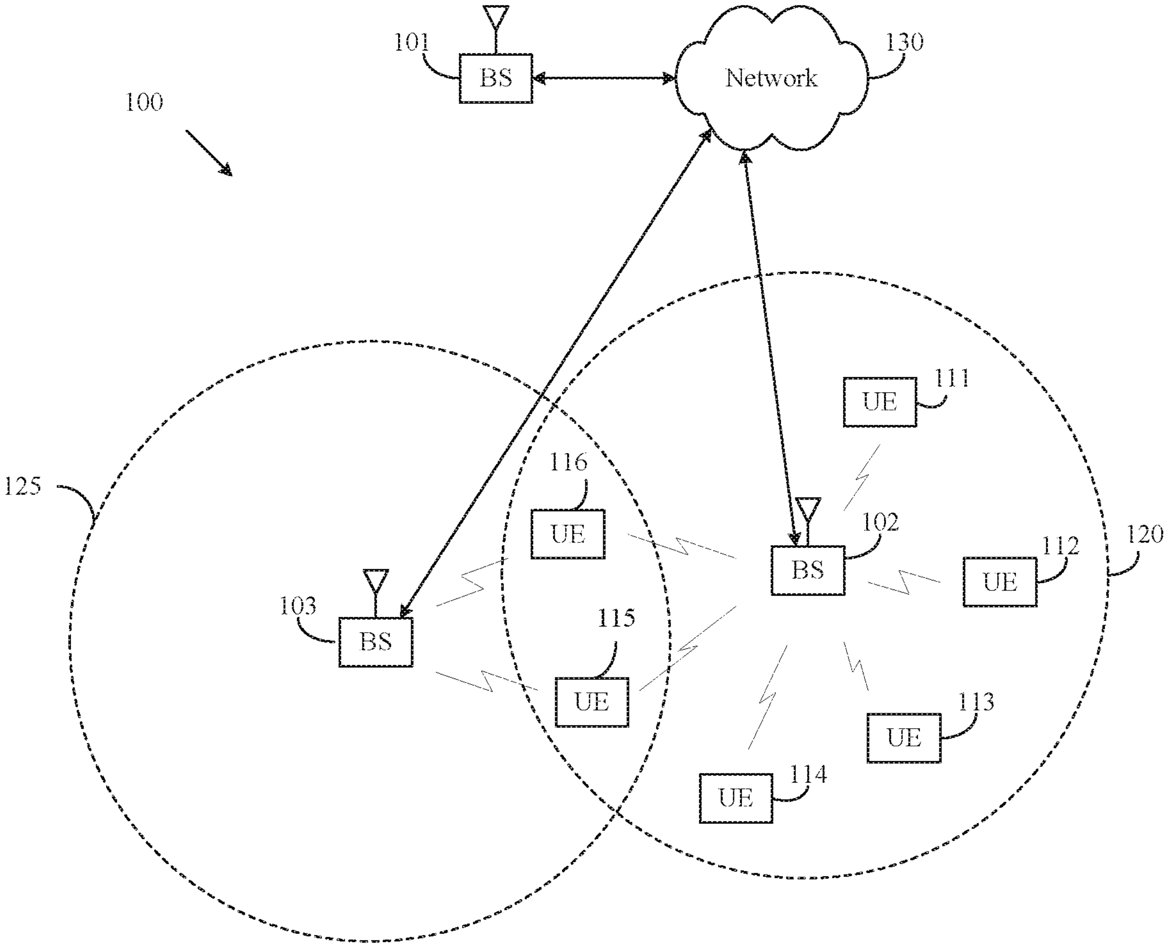
FIG. 1 illustrates an example of wireless network according to embodiments of the present disclosure.
Figure 2:
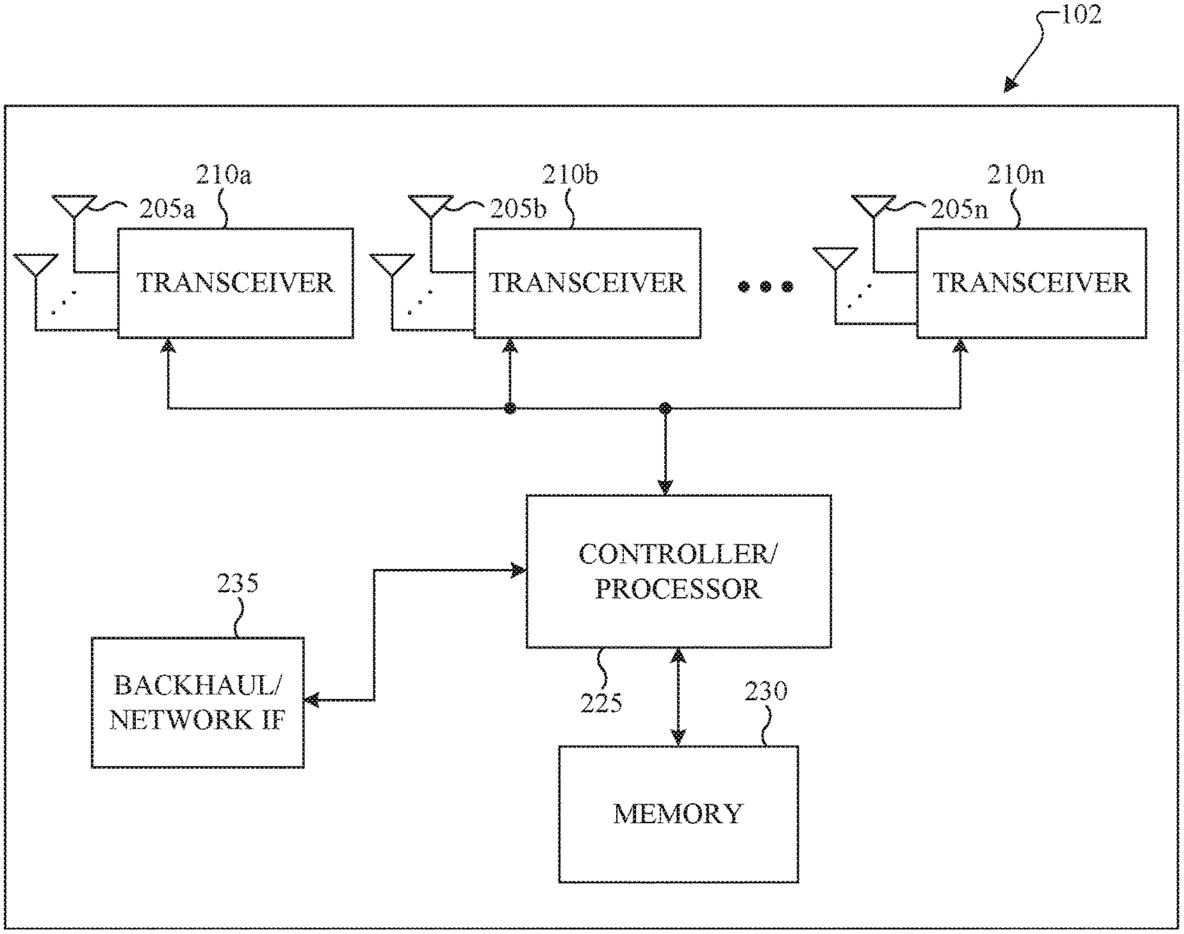
FIG. 2 illustrates an example of gNB according to embodiments of the present disclosure.
Figure 3:
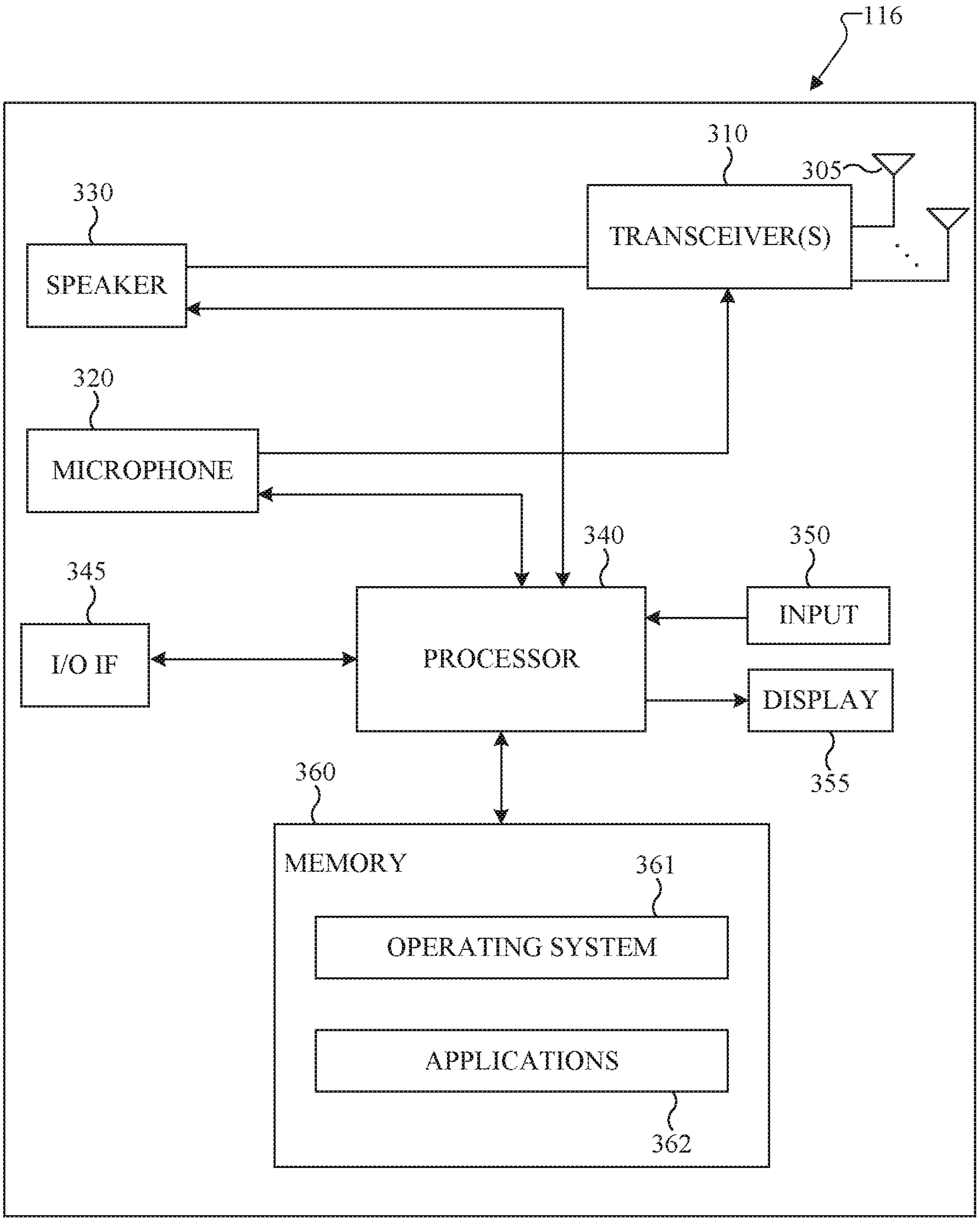
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a UE initiated reporting in a wireless communication system. In certain embodiments, and one or more of the gNBs 101-103 includes circuitry, programing, or a combination thereof, for supporting a UE initiated reporting in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for supporting a UE initiated reporting in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a UE initiated reporting in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355 which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
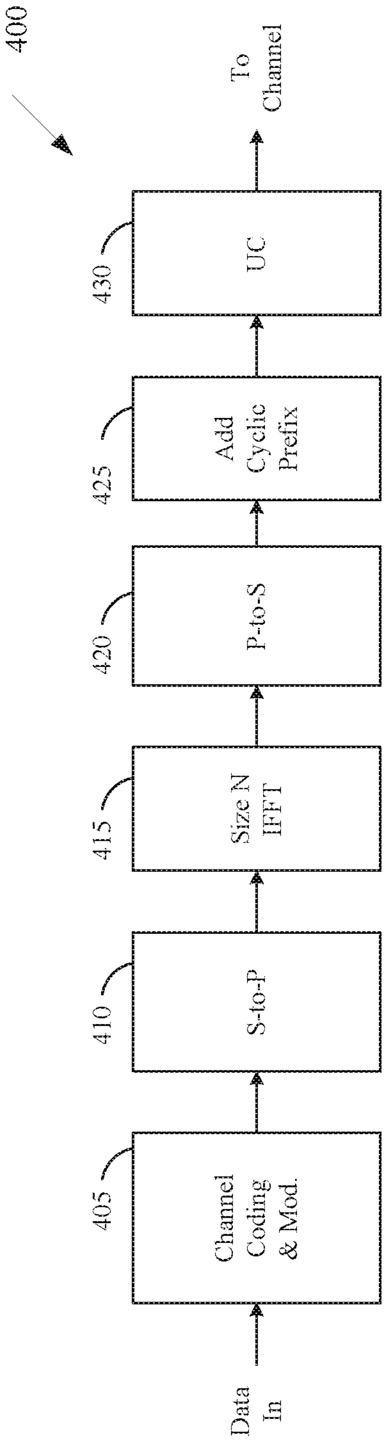
FIGS. 4 and 5 illustrate example of wireless transmit and receive paths according to this disclosure.
Figure 5:
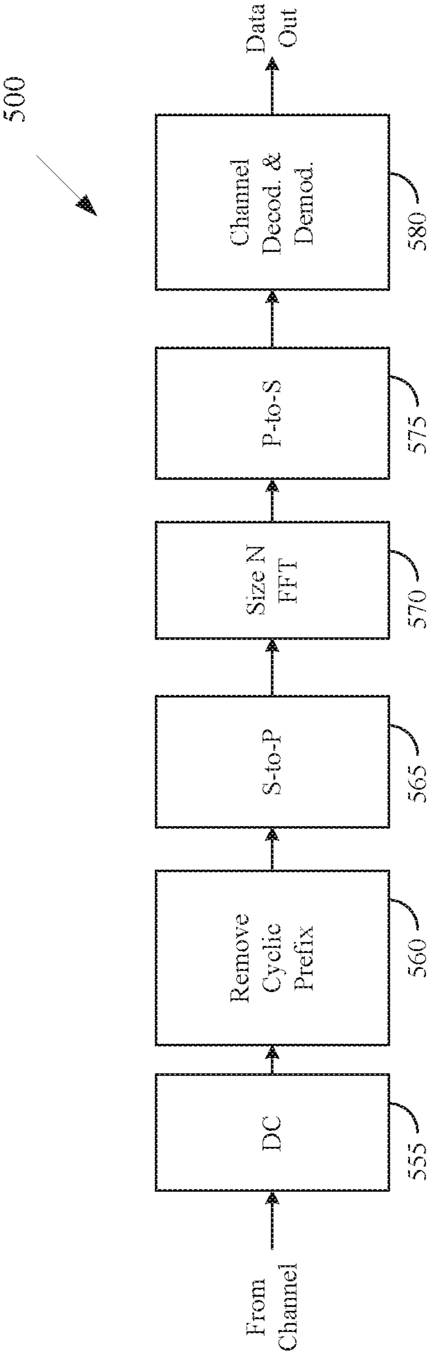

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to receive a UE initiated reporting in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indicator (TCI) state of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE. The TCI state and/or the spatial relation reference RS can determine a spatial Tx filter for transmission of downlink channels from the gNB, or a spatial Rx filter for reception of uplink channels at the gNB.

Figure 6A:
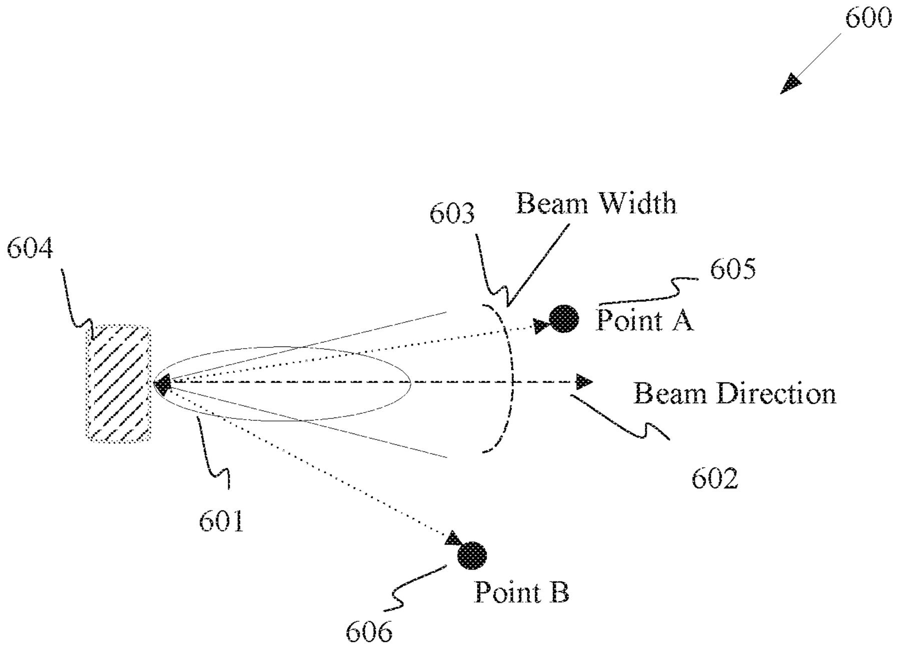
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
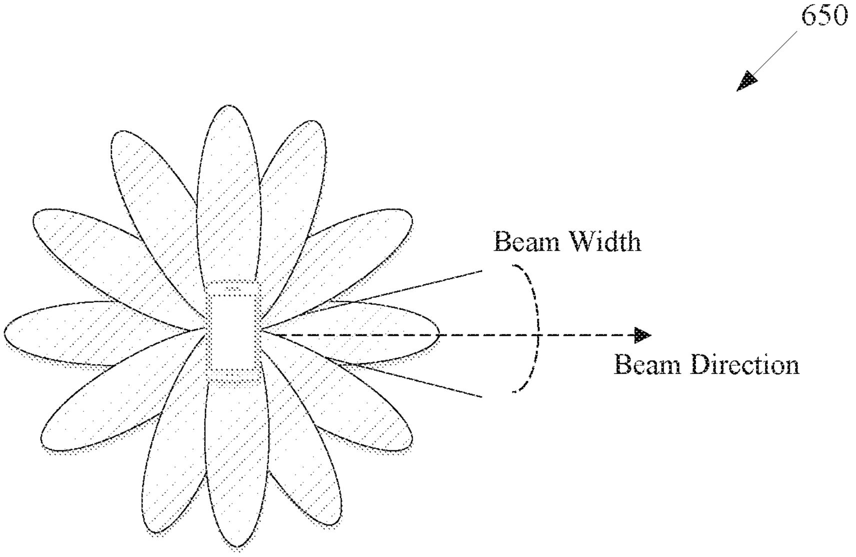
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
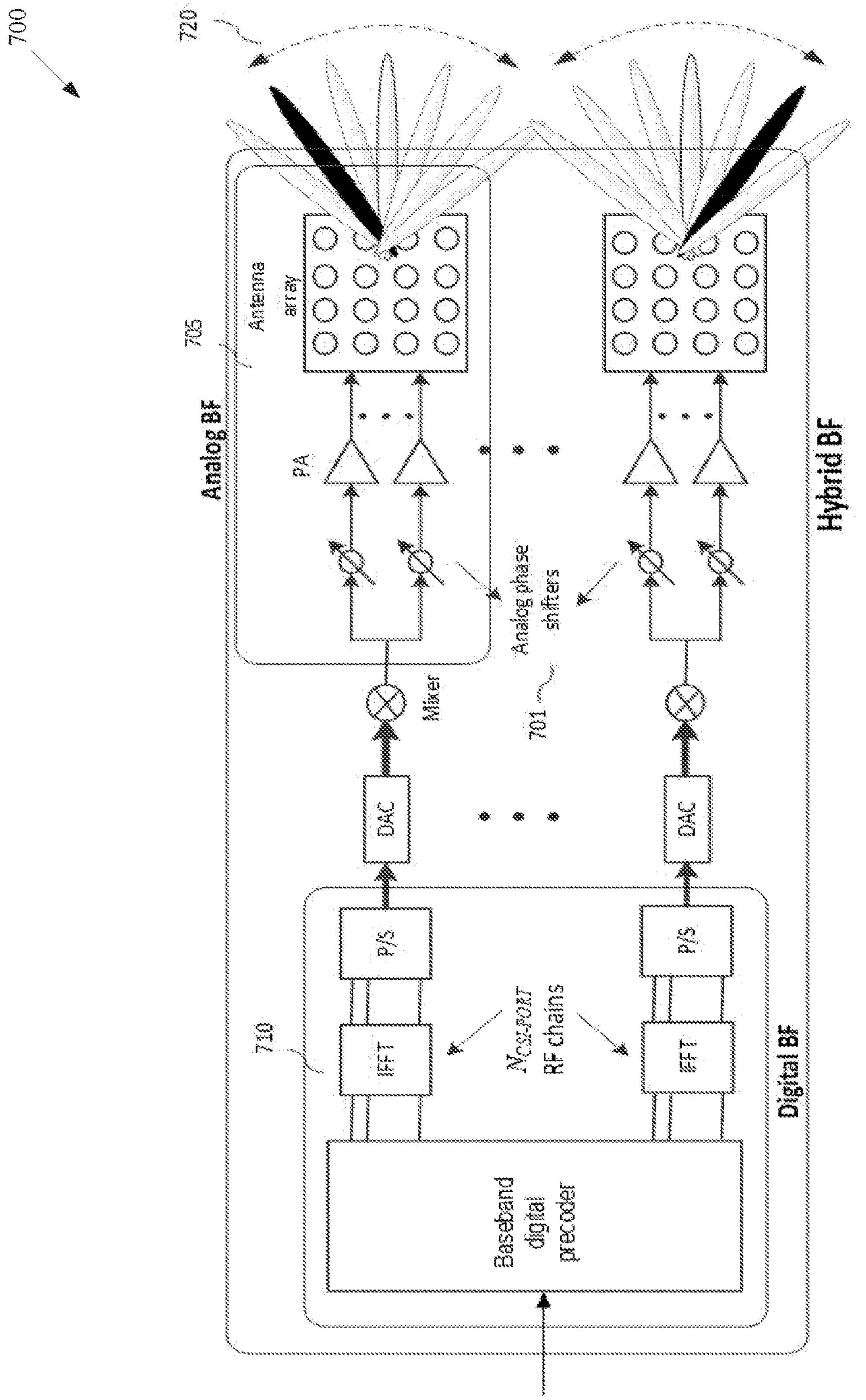
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI\text{-}PORT}$. A digital beamforming unit 710 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Rel-17 introduced the unified TCI framework, where a unified or master or main or indicated TCI state is signaled to the UE. The unified or master or main or indicated TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state that can be used at least for UE-dedicated DL channels; and (3) in case of separate TCI state indication, wherein different beams are used for DL and UL channels, a UL TCI state that can be used at least for UE-dedicated UL channels.

The unified (master or main or indicated) TCI state is TCI state of UE-dedicated reception on PDSCH/PDCCH or dynamic-grant/configured-grant based PUSCH and all of dedicated PUCCH resources.

The unified TCI framework applies to intra-cell beam management, wherein, the TCI states have a source RS that is directly or indirectly associated, through a quasi-co-location relation, e.g., spatial relation, with an SSB of a serving cell (e.g., the TCI state is associated with a TRP of a serving cell). The unified TCI state framework also applies to inter-cell beam management, wherein a TCI state can have a source RS that is directly or indirectly associated, through a quasi-co-location relation, e.g., spatial relation, with an SSB of cell that has a physical cell identity (PCI) different from the PCI of the serving cell (e.g., the TCI state is associated with a TRP of a cell having a PCI different from the PCI of the serving cell).

A QCL relation can be quasi-location with respect to one or more of the following relations (e.g., 3GPP standard specification 38.214): (1) Type A, {Doppler shift, Doppler spread, average delay, delay spread}; (2) Type B, {Doppler shift, Doppler spread}; (3) Type C, {Doppler shift, average delay}; and (4) Type D, {Spatial Rx parameter}.

In addition, a quasi-co-location relation and source reference signal can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel and sounding reference signal (SRS).

A UE is indicated a TCI state by medium access control channel element (MAC CE) when the CE activates one TCI state code point. The UE applies the TCI state code point after a beam application time from the corresponding HARQ-ACK feedback. A UE is indicated a TCI state by a DL related DCI format (e.g., DCI Format 1_1, or DCI format 1_2), wherein the DCI format includes a "transmission configuration indication" field that includes a TCI state code point out of the TCI state code points active by a MAC CE. A DL related DCI format can be used to indicate a TCI state when the UE is activated with more than one TCI state code points. The DL related DCI Format can be with a DL assignment or without a DL assignment. A TCI state (TCI state code point) indicated in a DL related DCI format is applied after a beam application time from the corresponding HARQ-ACK feedback.

In the present disclosure, a UE-initiated reporting is considered. Covering aspects related to channel and resources used for UL transmission of UE initiated report. UE initiated request and pre-notification signaling. Destination and TCI state used for UL transmissions that contain UE initiated report. The content of the UE initiated report is provided.

In release 15/16, a common framework is shared for CSI and beam management, while the complexity of such framework is justified for CSI in FR1, it makes beam management procedures rather cumbersome, and less efficient in FR2. Efficiency here refers to overhead associated with beam management operations and latency for reporting and indicating new beams.

Furthermore, in release 15 and release 16, the beam management framework is different for different channels. This increases the overhead of beam management and could lead to less robust beam-based operation. For example, for PDCCH the TCI state (used for beam indication), is updated through MAC CE signaling. While the TCI state of PDSCH can be updated through a DL DCI carrying the DL assignment with codepoints configured by MAC CE, or the PDSCH TCI state can follow that of the corresponding PDCCH, or use a default beam indication. In the uplink direction, the spatialRelationInfo framework is used for beam indication for PUCCH and SRS, which is updated through RRC and MAC CE signaling. For PUSCH the SRI (SRS Resource Indicator), in an UL DCI with UL grants, can be used for beam indication. Having different beam indications and beam indication update mechanisms increases the complexity, overhead and latency of beam management, and could lead to less robust beam-based operation.

Rel-17 introduced the unified TCI framework, wherein a unified or master or main or indicated TCI state is signaled to the UE. RRC signaling configures Rel-17 TCI states. MAC signaling can activate one or more TCI codepoints. When one TCI state codepoint is activated by MAC CE, the UE applies the TCI state(s) associated with the activated codepoint after a beam application time. When more than one TCI codepoints are activated by MAC CE, further DCI signaling is used to indicate a TCI state codepoint to the UE. The unified TCI state can be signaled by a DCI Format (e.g., DL related DCI Format (e.g., DCI Format 1_1 or DCI Format 1_2) with a DL assignment or a DL related DCI Format (e.g., DCI Format 1_1 or DCI Format 1_2) without a DL assignment.

For a UE measurement and reporting, the network can configure and/or activate and/or trigger a RS that is transmitted by the network and measured by the UE or an RS that is transmitted by the UE and measured by the network. The network can also configure and/or activate and/or trigger the channel used to report the measurement performed by the UE to the network. In some cases, such operation can lead to additionally latency, as the UE may wait for the network to configure, activate, or trigger the RS and/or channel for reporting the measurement. In some cases, such operation can lead to additional overhead as resources are being configured for the measurement RS and/or channel for reporting measurement, when the report has not changed between consecutive instances of reporting leading to inefficient utilization of air interface resources.

To mitigate, the previously mentioned, latency and/or overhead issues, UE initiated measurement and reporting is considered. The procedure for UE initiated measurement and/or reporting includes the following steps: (1) in step 1, the UE can send a pre-notification or request signal/channel to the gNB; (2) in step 2, the network can respond with signal providing resources and configuration for transmission of a report that includes measurements performed by the UE; and (3) in step 3, the UE provides a report.

In the present disclosure, the resources and signals used for UL transmissions carrying the pre-notification and request signaling as well as the UL transmissions that carry the UE initiate report are provided. In the present disclosure, the content of the UE initiated report is provided.

The present disclosure relates to a 5G/NR communication system.

The present disclosure considers aspects related to UE initiated reporting to reduce latency and overhead. The following components are considered: (1) Type of UL resource for transmission of UE initiated report; (2) request and Pre-notification signaling for a UE initiated report; (3) destination and spatial relation of UL resource; and (4) content of UE initiated report.

In the following, both FDD and TDD are considered as a duplex method for DL and UL signaling. Although exemplary descriptions and embodiments to follow assume OFDM or OFDMA, the present disclosure can be extended to other OFDM-based transmission waveforms or multiple access schemes such as filtered OFDM (F-OFDM).

The present disclosure considers several components that can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

In the present disclosure, RRC signaling (e.g., configuration by RRC signaling) includes the following: (1) system information block (SIB)-based RRC signaling (e.g., SIB1 or other SIB) and/or (2) RRC dedicated signaling that is sent to a specific UE.

In the present disclosure, a MAC CE signaling includes: (1) DL MAC CE signaling from gNB or network to UE, when transmitted by gNB, and/or (2) UL MAC CE signaling from UE to gNB, when transmitted from UE.

In the present disclosure, an L1 control signaling includes: (1) DL control information (e.g., DCI on PDCCH) when transmitted from the gNB or network to UE, and/or (2) UL control information (e.g., UCI on PUCCH or PUSCH) when transmitted from UE.

Terminology such as TCI, TCI states, SpatialRelationInfo, target RS, reference RS, and other terms is used for illustrative purposes and is therefore not normative. Other terms that refer to same functions can also be used.

A "reference RS" (e.g., reference source RS) corresponds to a set of characteristics of a DL beam or an UL TX beam, such as a direction, a precoding/beamforming, a number of ports, and so on. For instance, the UE can receive a source RS index/ID in a TCI state assigned to (or associated with) a DL transmission (and/or UL transmission), the UE applies the known characteristics of the source RS to the assigned DL transmission (and/or UL transmission). The source RS can be received and measured by the UE (in this case, the source RS is a downlink measurement signal such as NZP CSI-RS and/or SSB) with the result of the measurement used for calculating a beam report (e.g., including at least one L1-reference signal received power (RSRP)/L1—signal-to-interference-plus-noise ratio (SINR) accompanied by at least one CRI or SSBRI). As the NW/gNB receives the beam report, the NW can be better equipped with information to assign a particular DL (and/or UL) TX beam to the UE. Optionally or alternatively, the source RS can be transmitted by the UE (in this case, the source RS is an uplink measurement signal such as SRS). As the NW/gNB receives the source RS, the NW/gNB can measure and calculate the needed information to assign a particular DL (or/and UL) TX beam to the UE.

In the following components, a TCI state is used for beam indication. It can refer to a DL TCI state for downlink channels (e.g., PDCCH and PDSCH) or downlink signals, an uplink TCI state for uplink channels (e.g., PUSCH or PUCCH) or uplink signals, a joint TCI state for downlink and uplink channels, or separate TCI states for uplink and downlink channels/signals. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

Figure 8:
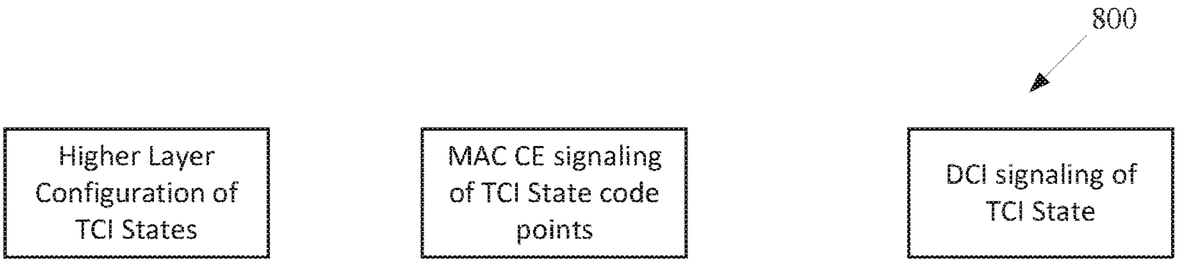
FIG. 8 illustrates an example of UE configuration according to embodiments of the present disclosure.

FIG. 8 illustrates an example of UE configuration 800 according to embodiments of the present disclosure. An embodiment of the UE configuration 800 shown in FIG. 8 is for illustration only.

In the following examples, as illustrated in FIG. 8, a UE is configured/updated through higher layer RRC signaling a set of TCI States with L elements. In one example, DL and joint TCI states are configured by higher layer parameter DLorJoint-TCIState, wherein, the number of DL and Joint TCI state is $L_{DJ}$. UL TCI state is configured by higher layer parameter UL-TCIState, wherein the number of UL TCI state is $L_U$. $L=L_{DJ}+L_U$, wherein L is the total number of DL, Joint and UL TCI states.

A MAC CE signaling includes a subset of K (K≤L) TCI states or TCI state code points from the set of L TCI states, wherein a code point is signaled in the "transmission configuration indication" field a DCI used for indication of the TCI state. A codepoint can include one TCI state (e.g., DL TCI state or UL TCI state or joint (DL and UL) TCI state). Alternatively, a codepoint can include two TCI states (e.g., a DL TCI state and an UL TCI state). L1 control signaling (i.e., DCI) updates the UE's TCI state, wherein the DCI includes a "transmission configuration indication" (beam indication) field e.g., with k bits (such that $K \leq 2^k$), the TCI state corresponds to a code point signaled by MAC CE. A DCI used for indication of the TCI state can be DL related DCI Format (e.g., DCI Format 1_1 or DCI Format 1_2), with a DL assignment or without a DL assignment.

The TCI states can be associated, through a QCL relation, with an SSB of serving cell, or an SSB associated with a PCI different from the PCI of the serving cell. The QCL relation with a SSB can be a direct QCL relation, wherein the source RS (e.g., for a QCL Type D relation or a spatial relation) of the QCL state is the SSB. The QCL relation with a SSB can be an indirect QCL relation, wherein, the source RS (e.g., for a QCL Type D relation or a spatial relation) can be a reference signal, and the reference signal has the SSB as its source (e.g., for a QCL Type D relation or a spatial relation). The indirect QCL relation to an SSB can involve a QCL or spatial relation chain of more than one reference signal.

The UE can use a DL related DCI (e.g., DCI Format 1_1 or DCI Format 1_2) without DL assignment, for beam indication. For example, the use of DL related DCI without DL assignment, can be configured by higher layers, or can be specified in the system specification.

Alternatively, the UE can use a DL related DCI (e.g., DCI Format 1_1 or DCI Format 1_2) with DL assignment, for beam indication. For example, the use of DL related DCI with DL assignment, can be configured by higher layers, or can be specified in the system specification.

In the following examples, the "transmission configuration indication" provided by a DCI format includes a TCI state codepoint activated by MAC CE. Wherein, the TCI state codepoint can be one of: (1) joint TCI state used for UL transmissions and DL receptions by the UE; (2) DL TCI state used for DL receptions by the UE; (3) UL TCI state used for UL transmissions by the UE; and (4) DL TCI state used for DL receptions by the UE and UL TCI states used for UL transmissions by the UE.

FIGS. 9-16 illustrates examples of communication between a base station and a UE 900-1600 according to embodiments of the present disclosure. Embodiments of the communication between a base station and a UE 900-1600 shown in FIGS. 9-16 are for illustration only.

Figure 9:
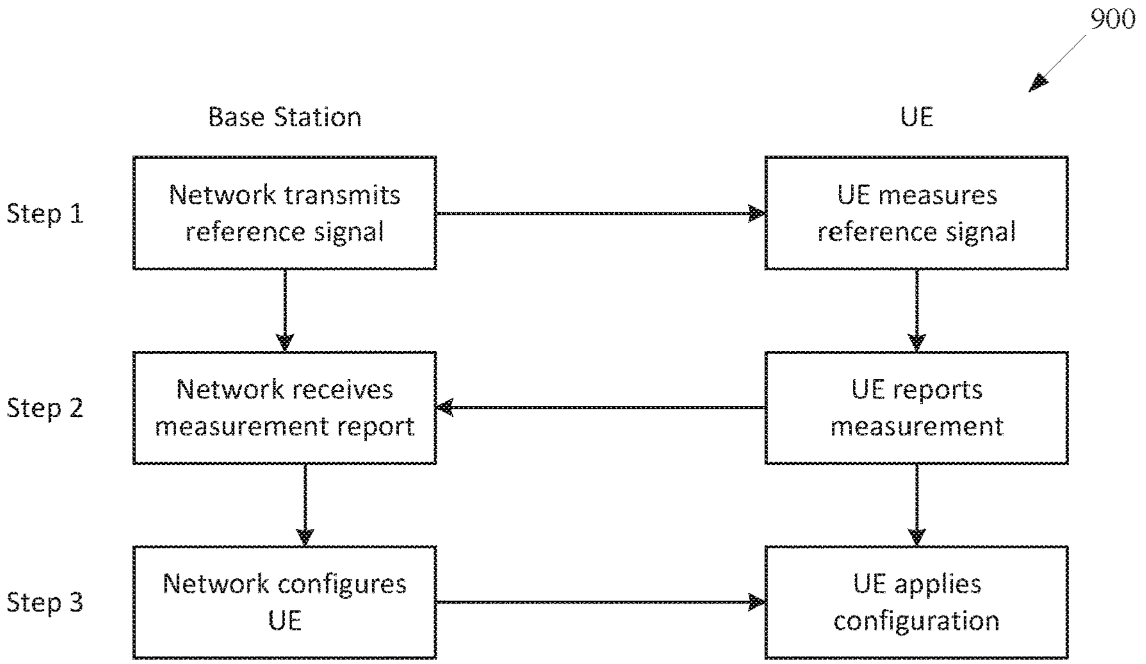
FIGS. 9-16 illustrates examples of communication between a base station and a UE according to embodiments of the present disclosure.

In one example as illustrated in FIG. 9, (1) the network (e.g., base Station (BS), gNB or TRP) transmits a RS, and the UE measures the RS, (2) the UE reports the measurement to the network and network receives the measurement, and (3) the network further configures the UE based on the measured reference signal and the UE applies the configuration.

In step 1 of FIG. 9, the RS can be (1) SSB and/or (2) a non-zero power channel state information reference signal (NZP CSI-RS) and/or (3) a DMRS associated with a PDSCH and/or PDCCH.

Figure 10:
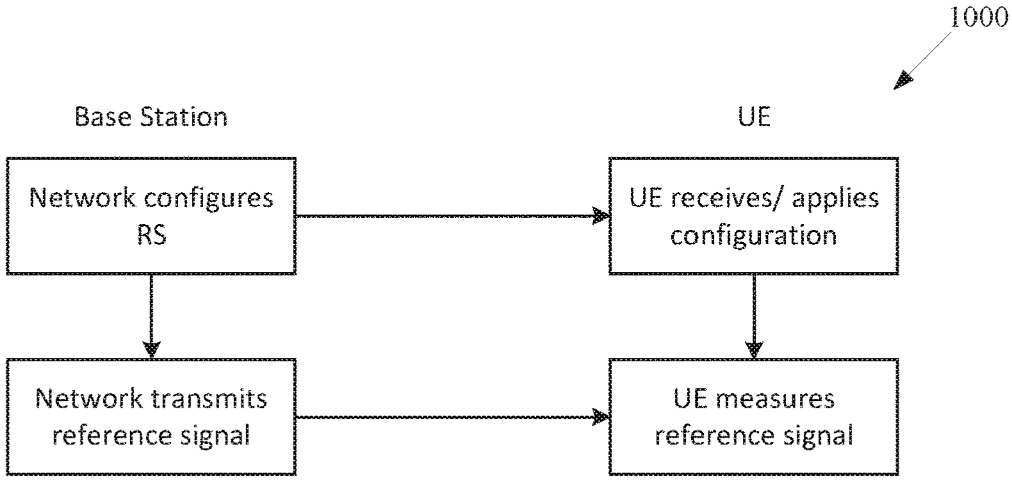
Figure 11:
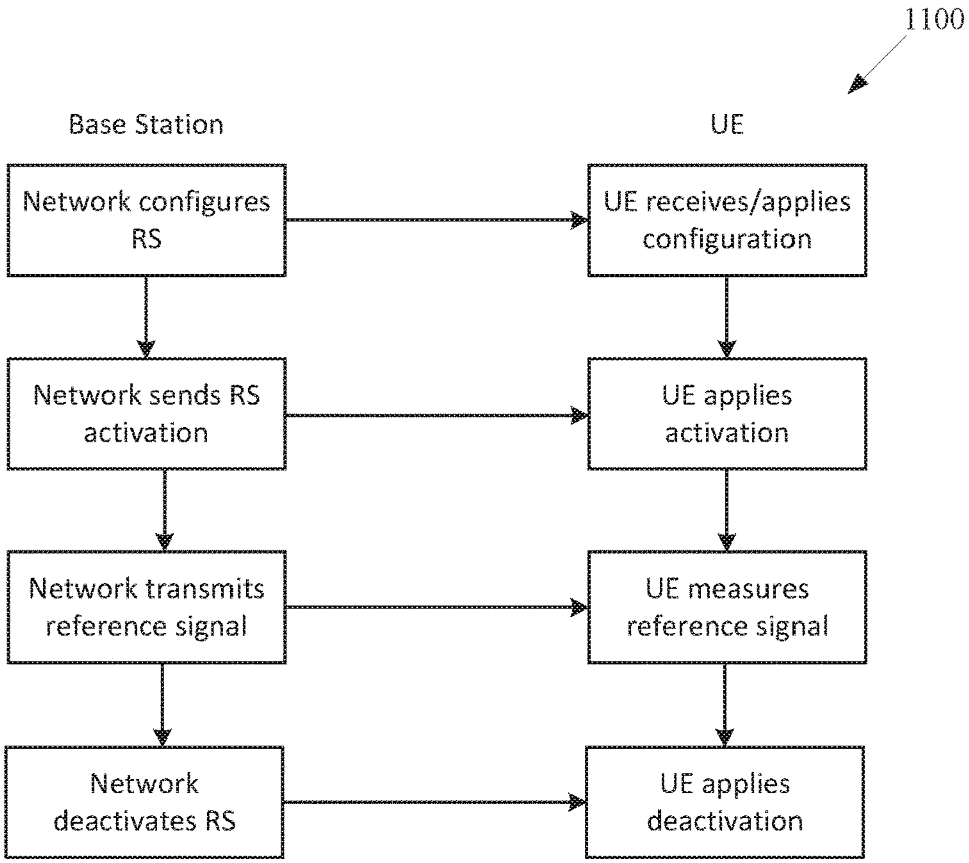
Figure 12:
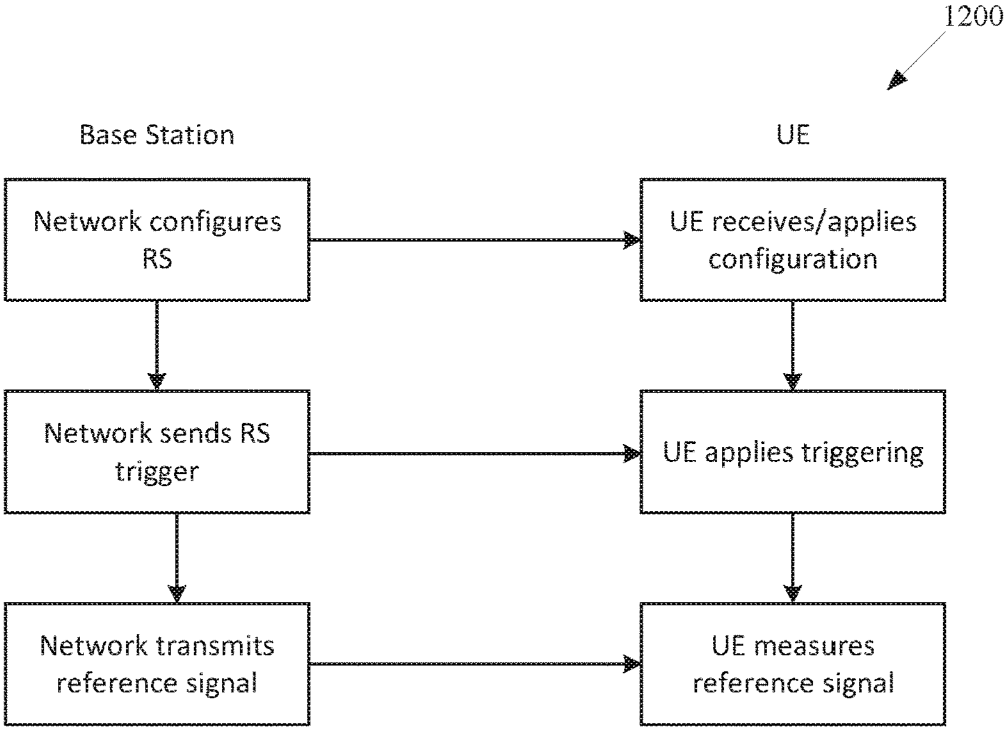

In step 1 of FIG. 9, the RS can be: periodically configured RS. This is illustrated in FIG. 10, wherein the network configures the RS (e.g., using higher layer configuration such as RRC configuration). The network then transmits the RS based on the configuration; (2) semi-persistent RS. This is illustrated in FIG. 11, wherein the network configures the RS (e.g., using higher layer configuration such as RRC configuration). But The RS is not transmitted until the RS is activated. For example, activation signaling can be MAC CE signaling and/or L1 control signaling (e.g., DCI signaling). After the RS is activated, the RS is transmitted (e.g., periodically) until the RS is deactivated. For example, deactivation signaling can be MAC CE signaling and/or L1 control signaling (e.g., DCI signaling). After the RS is deactivated, the RS is not transmitted until further activation; and (3) aperiodic RS. This is illustrated in FIG. 12, wherein the network configures the RS (e.g., using higher layer configuration such as RRC configuration). But the RS is not transmitted until the RS is triggered. For example, trigger signaling can be L1 control signaling (e.g., DCI signaling) and/or MAC CE signaling. In one example, trigger signaling can trigger one transmission instance of RS. In another example trigger signaling can trigger N transmission instances of RS. Wherein, N can be specified in specifications and/or configured by higher layer signaling (e.g., RRC signaling and/or MAC CE signaling) and/or configured by L1 control signaling (e.g., DCI signaling) and/or included in the message triggering the transmission of the RS.

In step 1 of FIG. 9, the measurement can be: (1) beam related measurement (e.g., L1-RSRP measurement and/or L1-SINR measurement); (2) mobility (e.g., handover) measurement (e.g., L1-RSRP measurement, L3-RSRP measurement, L1-SINR measurement and/or RSRQ measurement); (3) CSI related measurement (e.g., for CQI and/or for PMI and/or for RI); (4) time domain channel properties (TDCP) measurement (e.g., for Doppler profile and/or auto correlation profile; (5) time related measurements (e.g., time of arrival difference of RS from different transmission points); and (6) other non-beam, non-mobility, non-CSI, non-TDCP, non-time related measurements.

In step 2 of FIG. 9, the UE provides the measurement report to the network. The measurement report can be: (1) periodic measurement report. The network configures the measurement (e.g., using higher layer configuration such as RRC configuration). The UE then transmits the measurement report based on the configuration; (2) semi-persistent measurement report. The network configures the measurement report (e.g., using higher layer configuration such as RRC configuration). But The measurement report is not transmitted until the measurement report is activated. For example, activation signaling can be MAC CE signaling and/or L1 control signaling (e.g., DCI signaling). After the measurement report is activated, the measurement report is transmitted (e.g., periodically) until the measurement report is deactivated. For example, deactivation signaling can be MAC CE signaling and/or L1 control signaling (e.g., DCI signaling). After the measurement report is deactivated, the measurement report is not transmitted until further activation. In one example, the activation or deactivation for an RS can also activate or deactivate the measurement report or vice versa; and (3) aperiodic measurement report. The network configures the measurement report (e.g., using higher layer configuration such as RRC configuration). But the measurement report is not transmitted until the measurement report is triggered. For example, trigger signaling can be L1 control signaling (e.g., DCI signaling) and/or MAC CE signaling. In one example, trigger signaling can trigger one transmission instance of measurement report. In another example trigger signaling can trigger N transmission instances of measurement report. Wherein, N can be specified in specifications and/or configured by higher layer signaling (e.g., RRC signaling and/or MAC CE signaling) and/or configured by L1 control signaling (e.g., DCI signaling) and/or included in the message triggering the transmission of the measurement report. In one example, the trigger for an RS can also trigger the measurement report.

In step 2 of FIG. 9, the measurement report can be transmitted using at least one of the following UL transmissions: (1) PUSCH, wherein the PUSCH can be a dynamically scheduled PUSCH and/or a configure grant PUSCH (e.g., Type 1 configured grant and/or Type 2 configured grant). (2) PUCCH. (3) RACH, wherein RACH can be Type 1 RACH and/or Type 2 RACH, furthermore RACH can be contention based random access (CBRA) and/or contention free random access (CFRA), furthermore RACH can be triggered by higher layers or triggered by a PDCCH order.

In step 2 of FIG. 9, the measurement report can be: (1) a one-part (or one stage) measurement report. (2) a two-part (or two-stage) measurement report, for example the first part can have a fixed size and the first part provides information about the size and/or content of the second part.

In step 2 of FIG. 9, the measurement report can be a report for beam measurements (e.g., including L1-RSRP and/or L1-SINR and/or beam indicator (e.g., TCI state)). In one example, the report can include N pairs of L1 metric (e.g., L1-RSRP or L1-SINR) and a corresponding reference signal (e.g., SS/PBCH Block ID and/or CSI-RS ID and/or spatial relation ID and/or TCI state ID and/or TCI codepoint ID). In one example, the N pairs are for a single TRP. In one example, the N pairs are for multiple TRPs associated with the serving cell. In one example, the N pairs are for multiple TRPs associated with a same cell. In one example, the N pairs are for multiple TRPs associated with one or more cells, in one example whether the serving cell is included can be configured and/or updated by higher layer signaling (e.g., RRC signaling) and/or MAC CE signaling and/or L1 control (e.g., DCI) signaling.

In one example, N can be determined by the UE, e.g., not to exceed a maximum value $N_{max}$, wherein $N_{max}$ can be specified in the system specification (e.g., $N_{max}=4$) and/or $N_{max}$ can be configured and/or updated by higher layer signaling (e.g., RRC signaling) and/or MAC CE signaling and/or L1 control (e.g., DCI) signaling. In one example, $N_{max}$ depends on a UE capability.

In one example, N can be specified in the system specification (e.g., N=4) and/or N can be configured and/or updated by higher layer signaling (e.g., RRC signaling) and/or MAC CE signaling and/or L1 control (e.g., DCI) signaling. In one example, N depends on a UE capability.

In one example, N equals 1.

In one example, the report can include K TCI state codepoints, wherein the TCI state codepoints are TCI state codepoints activated by MAC CE (e.g., from P activated TCI state codepoints). A TCI state codepoint can correspond to: (1) one or more DL TCI state(s) and/or (2) one or more UL TCI state(s) and/or (3) one or more Joint TCI states. For example, in case of single TRP, a TCI state codepoint can be (1) a DL TCI state, (2) an UL TCI state, (3) a joint TCI state, (4) a pair of DL TCI state and UL TCI state. For example, in case of multi (e.g., N, as one example N=2) TRPs, a TCI state codepoint can be (1) M (e.g., M=1 or M=2 or M=N) DL TCI states, (2) M (e.g., M=1 or M=2 or M=N) UL TCI states, (3) M (e.g., M=1 or M=2 or M=N) joint TCI states, (4) M (e.g., M=1 or M=2 or M=N) pairs of DL TCI state and UL TCI state, (5) A DL TCI states, B UL TCI states, C Joint TCI states, D pairs of DL TCI state and UL TCI state, where A+B+C+D is less than or equal to N, or A+C+D and B+C+D is each less than or equal N. In one example, the K TCI state codepoints are for a single TRP. In one example, the K TCI state codepoints are for multiple TRPs associated with the serving cell. In one example, the K TCI state codepoints are for multiple TRPs associated with a same cell. In one example, the K TCI state codepoints are for multiple TRPs associated with one or more cells, in one example whether the serving cell is included can be configured and/or updated by higher layer signaling (e.g., RRC signaling) and/or MAC CE signaling and/or L1 control (e.g., DCI) signaling.

In one example, K can be determined by the UE, e.g., not to exceed a maximum value $K_{max}$, wherein $K_{max}$ can be specified in the system specification (e.g., $K_{max}$=4) and/or $K_{max}$ can be configured and/or updated by higher layer signaling (e.g., RRC signaling) and/or MAC CE signaling and/or L1 control (e.g., DCI) signaling. In one example, $K_{max}$ depends on a UE capability.

In one example, K can be specified in the system specification (e.g., K=4) and/or K can be configured and/or updated by higher layer signaling (e.g., RRC signaling) and/or MAC CE signaling and/or L1 control (e.g., DCI) signaling. In one example, K depends on a UE capability.

In one example K equals 1.

In one example, the report can include K TCI state IDs corresponding to K TCI states. In one example, the K TCI states are from the activated (e.g., MAC CE activated) TCI states (e.g., from Q activated TCI states). In another example the K TCI states are from the configured (e.g., RRC configured) TCI state states (e.g., from R configured TCI states). In one example the report can include K groups of TCI IDs. In one example, a group can include A DL TCI state IDs, B UL TCI state IDs, C Joint TCI state IDs, and D pairs of DL TCI state IDs and UL TCI state IDs. In one example, A+B+C+D is less than or equal to N. In one example, A+C+D and B+C+D is each less than or equal to N. In one example N=1, e.g., for single TRP. In one example N=2 e.g., for multi or 2 TRPs. In one example, N configured and/or updated by higher layer signaling (e.g., RRC signaling) and/or MAC CE signaling and/or L1 control (e.g., DCI) signaling. In one example, the K TCI state IDs or group of TCI state IDs are for a single TRP. In one example, the K TCI state IDs or group of TS state IDs are for multiple TRPs associated with the serving cell. In one example, the K TCI state IDs or group of TS state IDs are for multiple TRPs associated with a same cell. In one example, the K TCI state IDs or group of TS state IDs are for multiple TRPs associated with one or more cells, in one example whether the serving cell is included can be configured and/or updated by higher layer signaling (e.g., RRC signaling) and/or MAC CE signaling and/or L1 control (e.g., DCI) signaling.

In one example, K can be determined by the UE, e.g., not to exceed a maximum value $K_{max}$, wherein $K_{max}$ can be specified in the system specification (e.g., $K_{max}$=4) and/or $K_{max}$ can be configured and/or updated by higher layer signaling (e.g., RRC signaling) and/or MAC CE signaling and/or L1 control (e.g., DCI) signaling. In one example, $K_{max}$ depends on a UE capability.

In one example, K can be specified in the system specification (e.g., K=4) and/or K can be configured and/or updated by higher layer signaling (e.g., RRC signaling) and/or MAC CE signaling and/or L1 control (e.g., DCI) signaling. In one example, K depends on a UE capability.

In one example K equals 1.

In one example, the report can include a combination of N pairs of L1 metric and a corresponding reference signal, and K TCI state IDs or K TCI state codepoints following the aforementioned examples.

In step 2 of FIG. 9, the measurement report can be a report for mobility (or handover) measurements (e.g., including L1-RSRP and/or L3-RSRP and/or L1-SINR and/or RSRQ and/or beam indicator (e.g., TCI state) and/or cell indicator).

In one example, the report can include N pairs of L1 metric (e.g., L1-RSRP or L1-SINR) and a corresponding reference signal (e.g., SS/PBCH Block ID and/or CSI-RS ID and/or spatial relation ID and/or TCI state ID and/or TCI codepoint ID. In one example, N pairs are for L cells (e.g., the reference signal corresponding to a cell). In one example, the L cells include non-serving cells (e.g., Target cells). In one example, the L cells include the serving cell and non-serving cells (e.g., Target cells). In one example, whether to include the serving cell in the report can be configured and/or updated by higher signaling (e.g., RRC signaling) and/or MAC CE signaling and/or L1 control (e.g., DCI) signaling.

In one example, the report can include N×L pairs of L1 metric (e.g., L1-RSRP or L1-SINR) and a corresponding reference signal (e.g., SS/PBCH Block ID and/or CSI-RS ID and/or spatial relation ID and/or TCI state ID and/or TCI codepoint ID. In one example, N is the pairs per cell and L is the number of cells (e.g., the reference signal corresponding to a cell). In one example, the L cells include non-serving cells (e.g., Target cells). In one example, the L cells include the serving cell and non-serving cells (e.g., Target cells). In one example, whether to include the serving cell in the report can be configured and/or updated by higher signaling (e.g., RRC signaling) and/or MAC CE signaling and/or L1 control (e.g., DCI) signaling.

In one example, the report can include K TCI state codepoints, wherein the TCI state codepoints are TCI state codepoints activated by MAC CE (e.g., from P activated TCI state codepoints). The TCI state codepoint can be as aforementioned. In one example, K TCI state codepoints are for L cells (e.g., the TCI state codepoints corresponding to a cell). In one example, the L cells include non-serving cells (e.g., target cells). In one example, the L cells include the serving cell and non-serving cells (e.g., target cells). In one example, whether to include the serving cell in the report can be configured and/or updated by higher signaling (e.g., RRC signaling) and/or MAC CE signaling and/or L1 control (e.g., DCI) signaling.

In one example, the report can include K TCI state IDs corresponding to K TCI states. In one example, the K TCI states are from the activated (e.g., MAC CE activated) TCI states (e.g., from Q activated TCI states). In another example the K TCI states are from the configured (e.g., RRC configured) TCI state states (e.g., from R configured TCI states). In one example the report can include K groups of TCI IDs as aforementioned. In one example, K TCI state IDs or group of TCI state IDs are for L cells (e.g., the TCI states corresponding to a cell). In one example, the L cells include non-serving cells (e.g., Target cells). In one example, the L cells include the serving cell and non-serving cells (e.g., Target cells). In one example, whether to include the serving cell in the report can be configured and/or updated by higher signaling (e.g., RRC signaling) and/or MAC CE signaling and/or L1 control (e.g., DCI) signaling.

In one example, the report can include K×L TCI state codepoints, wherein the TCI state codepoints are TCI state codepoints activated by MAC CE (e.g., from P activated TCI state codepoints). The TCI state codepoint can be as aforementioned. In one example, K is the TCI state codepoints per cell and L is the number of cells (e.g., TCI state codepoint corresponding to a cell). In one example, the L cells include non-serving cells (e.g., target cells). In one example, the L cells include the serving cell and non-serving cells (e.g., target cells). In one example, whether to include the serving cell in the report can be configured and/or updated by higher signaling (e.g., RRC signaling) and/or MAC CE signaling and/or L1 control (e.g., DCI) signaling.

In one example, the report can include K×L TCI state IDs corresponding to K TCI states. In one example, the K TCI states are from the activated (e.g., MAC CE activated) TCI states (e.g., from Q activated TCI states). In another example the K TCI states are from the configured (e.g., RRC configured) TCI state states (e.g., from R configured TCI states). In one example the report can include K groups of TCI IDs as aforementioned. In one example, K is the TCI state IDs or group of TCI state IDs per cell and L is the number of cells (e.g., TCI state corresponding to a cell). In one example, the L cells include non-serving cells (e.g., Target cells). In one example, the L cells include the serving cell and non-serving cells (e.g., Target cells). In one example, whether to include the serving cell in the report can be configured and/or updated by higher signaling (e.g., RRC signaling) and/or MAC CE signaling and/or L1 control (e.g., DCI) signaling.

In the above examples, the following can apply.

In one example, N can be determined by the UE, e.g., not to exceed a maximum value $N_{max}$, wherein $N_{max}$ can be specified in the system specification (e.g., $N_{max}=4$) and/or $N_{max}$ can be configured and/or updated by higher layer signaling (e.g., RRC signaling) and/or MAC CE signaling and/or L1 control (e.g., DCI) signaling. In one example, $N_{max}$ depends on a UE capability.

In one example, N can be specified in the system specification (e.g., N=4) and/or N can be configured and/or updated by higher layer signaling (e.g., RRC signaling) and/or MAC CE signaling and/or L1 control (e.g., DCI) signaling. In one example, N depends on a UE capability.

In one example, N equals 1.

In one example, L can be determined by the UE, e.g., not to exceed a maximum value $L_{max}$, wherein $L_{max}$ can be specified in the system specification (e.g., $L_{max}=2$ or $L_{max}=1$) and/or $L_{max}$ can be configured and/or updated by higher layer signaling (e.g., RRC signaling) and/or MAC CE signaling and/or L1 control (e.g., DCI) signaling. In one example, $L_{max}$ depends on a UE capability.

In one example, L can be specified in the system specification (e.g., L=4) and/or L can be configured and/or updated by higher layer signaling (e.g., RRC signaling) and/or MAC CE signaling and/or L1 control (e.g., DCI) signaling. In one example, L depends on a UE capability.

In one example, L equals 1.

In one example, K can be determined by the UE, e.g., not to exceed a maximum value $K_{max}$, wherein $K_{max}$ can be specified in the system specification (e.g., $K_{max}=4$) and/or $K_{max}$ can be configured and/or updated by higher layer signaling (e.g., RRC signaling) and/or MAC CE signaling and/or L1 control (e.g., DCI) signaling. In one example, $K_{max}$ depends on a UE capability.

In one example, K can be specified in the system specification (e.g., K=4) and/or K can be configured and/or updated by higher layer signaling (e.g., RRC signaling) and/or MAC CE signaling and/or L1 control (e.g., DCI) signaling. In one example, K depends on a UE capability.

In one example K equals 1.

In step 2 of FIG. 9, the measurement report can be a report for CSI related measurements (e.g., including CSI and/or PMI and/or RI and/or L1 and/or CRI).

In step 2 of FIG. 9, the measurement report can be a report for TDCP related measurements (e.g., including TDCP-related quantity/quantities and/or indicator(s) for Doppler profile and/or indicator(s) for auto-correlation profile).

In step 2 of FIG. 9, the measurement report can be a report for time related measurements (e.g., including time of arrival difference of RS from different transmission points).

In step 2 of FIG. 9, the measurement report can be a report for other non-beam, non-mobility, non-CSI, non-TDCP, non-time related measurements.

In step 3 of FIG. 9, after receiving the measurement report the network takes an action based on the measurement report and the UE applies the indicated action. For example, the action be one of: (1) application of a new beam (e.g., TCI state or spatial relation reference signal); (2) trigger mobility to a target cell; (3) update codebook related parameters; (4) update Doppler related parameters; (5) update TA; and (6) updated configuration based on other non-beam, non-mobility, non-CSI, non-TDCP, non-time related measurements.

Figure 13:
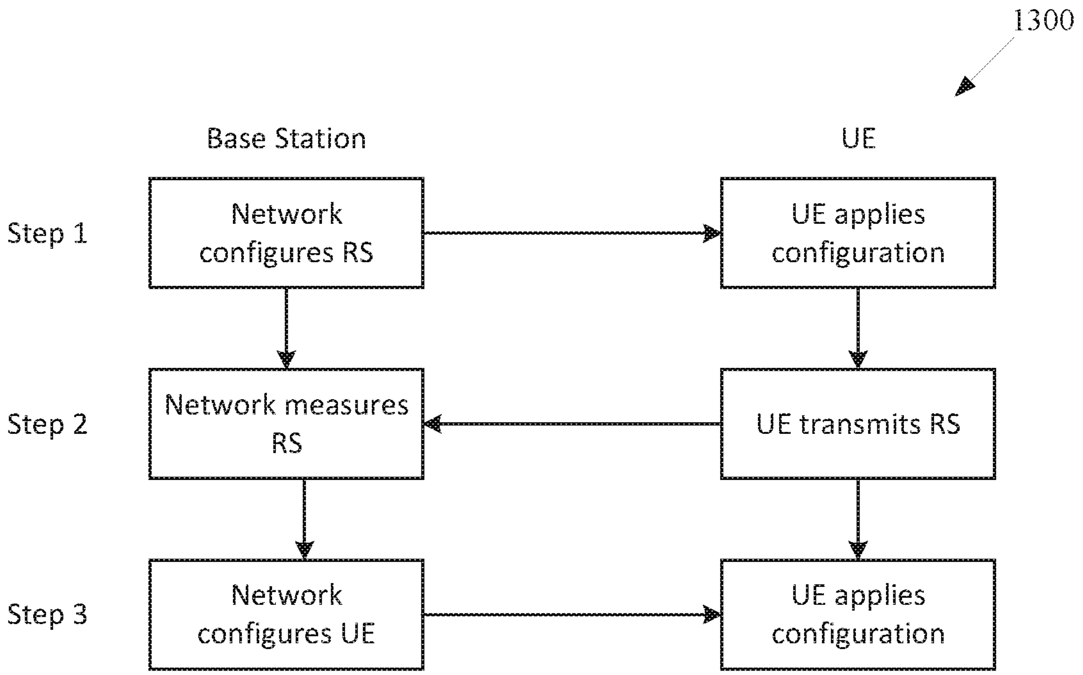

In one example as illustrated in FIG. 13, (1) the network (e.g., base station (BS), gNB or TRP) configures and/or activates and/or triggers a UE to transmit a RS, and the UE receives and applies such configuration and/or activation and/or triggering. (2) The UE transmits the RS, and the gNB measures the RS. (3) The network further configures the UE based on the measured reference signal and the UE applies the configuration.

In step 2 of FIG. 13, the RS can be (1) Sounding Reference Signal (SRS) and/or (2) a DMRS associated with a PUSCH and/or PUCCH and/or (3) a random-access preamble.

Figure 14:
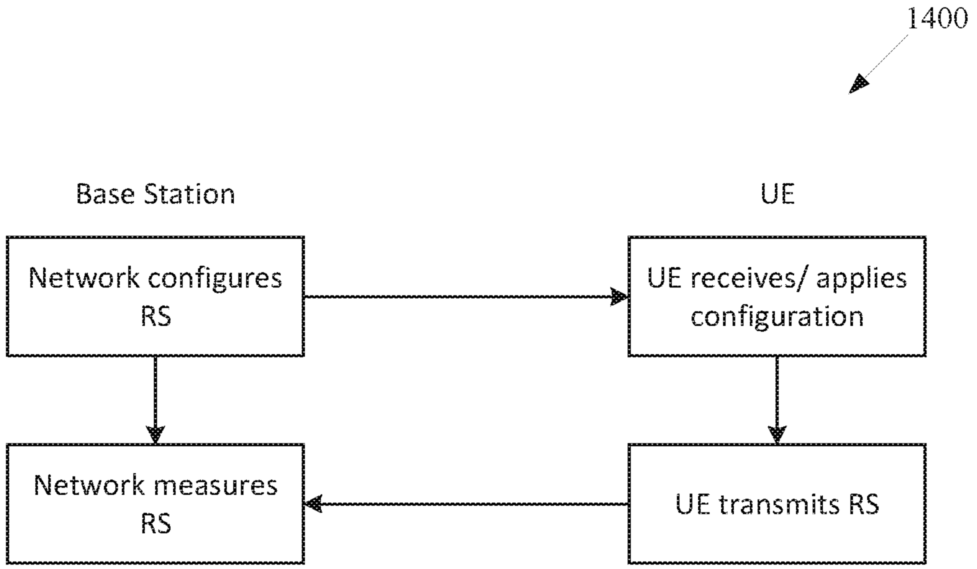
Figure 15:
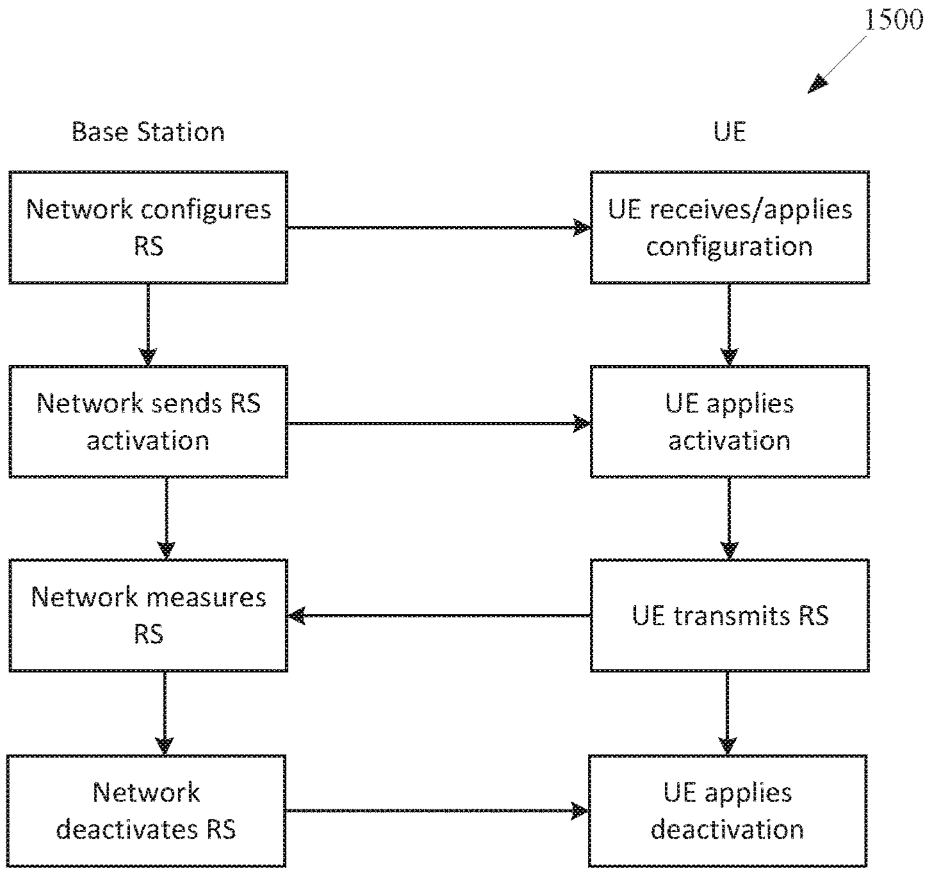
Figure 16:
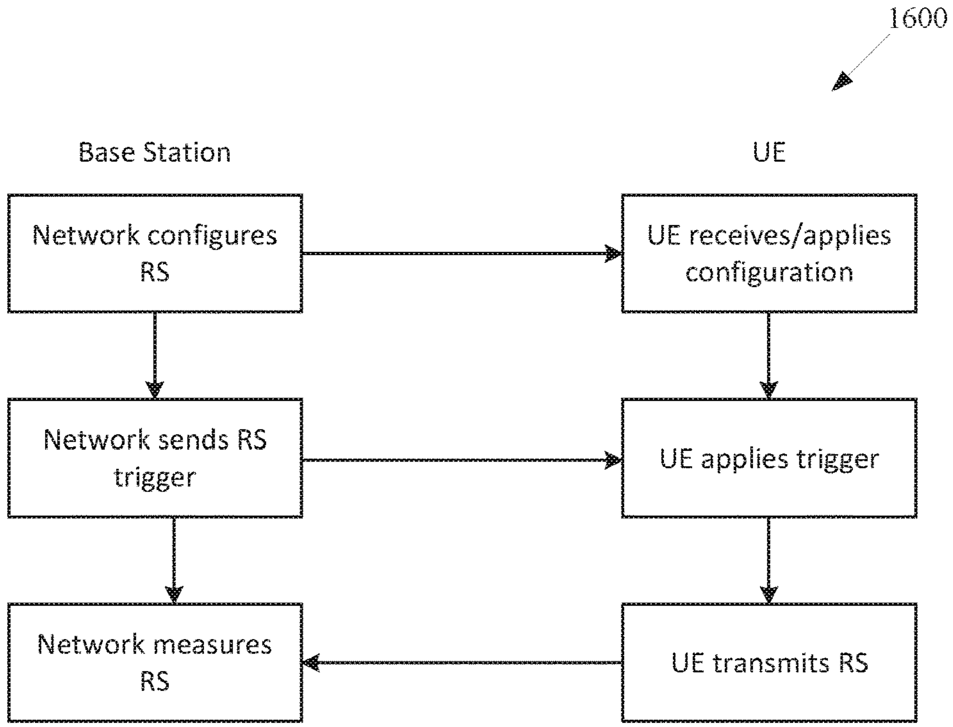

In step 1/step 2 of FIG. 13, the RS can be: (1) periodically configured RS. This is illustrated in FIG. 14, wherein the network configures the RS (e.g., using higher layer configuration such as RRC configuration). The UE then transmits the RS based on the configuration; (2) semi-persistent RS. This is illustrated in FIG. 15, wherein the network configures the RS (e.g., using higher layer configuration such as RRC configuration). But The RS is not transmitted by the UE until the RS is activated. For example, activation signaling can be MAC CE signaling and/or L1 control signaling (e.g., DCI signaling). After the RS is activated, the RS is transmitted by the UE (e.g., periodically) until the RS is deactivated. For example, deactivation signaling can be MAC CE signaling and/or L1 control signaling (e.g., DCI signaling). After the RS is deactivated, the RS is not transmitted until further activation; and (3) aperiodic RS. This is illustrated in FIG. 16, wherein the network configures the RS (e.g., using higher layer configuration such as RRC configuration). But the RS is not transmitted until the RS is triggered. For example, trigger signaling can be L1 control signaling (e.g., DCI signaling) and/or MAC CE signaling. In one example, trigger signaling can trigger one transmission instance of RS. In another example trigger signaling can trigger N transmission instances of RS. Wherein, N can be specified in specifications and/or configured by higher layer signaling (e.g., RRC signaling and/or MAC CE signaling) and/or configured by L1 control signaling (e.g., DCI signaling) and/or included in the message triggering the transmission of the RS.

In step 2 of FIG. 13, the measurement can be: (1) beam related measurement (e.g., L1-RSRP measurement and/or L1-SINR measurement); (2) mobility (e.g., handover) measurement (e.g., L1-RSRP measurement, L3-RSRP measurement, L1-SINR measurement and/or RSRQ measurement); (3) CSI related measurement (e.g., to determine a channel quality and/or precoding matrix and/or a rank for the channel); (4) TDCP measurement (e.g., for Doppler profile and/or auto correlation profile; (5) time related measurements (e.g., time of arrival difference of RS from UE); and (6) other non-beam, non-mobility, non-CSI, non-TDCP, non-time related measurements.

In step 3 of FIG. 13, after performing the measurement on the RS transmitted by the UE, the network takes an action based on the measurement and the UE applies the indicated action. For example, the action be one of: (1) application of a new beam (e.g., TCI state or spatial relation reference signal); (2) trigger mobility to a target cell; (3) update codebook related parameters; (4) update Doppler related parameters; (5) update TA; and (6) updated configuration based on other non-beam, non-mobility, non-CSI, non-TDCP, non-time related measurements.

Based on the previous description, the network can configure and/or activate and/or trigger the RS that is transmitted by the network and measured by the UE or the RS that is transmitted by the UE and measured by the network. The network can also configure and/or activate and/or trigger the channel used to report the measurement performed by the UE to the network. In some cases, such operation can lead to additionally latency, as the UE may wait for the network to configure, activate or trigger the RS and/or channel for reporting the measurement. In some cases, such operation can lead to additional overhead as resources are being configured for the measurement RS and/or channel for reporting measurement, when the report has not changed between consecutive instances of reporting leading to inefficient utilization of air interface resources.

Figure 17:
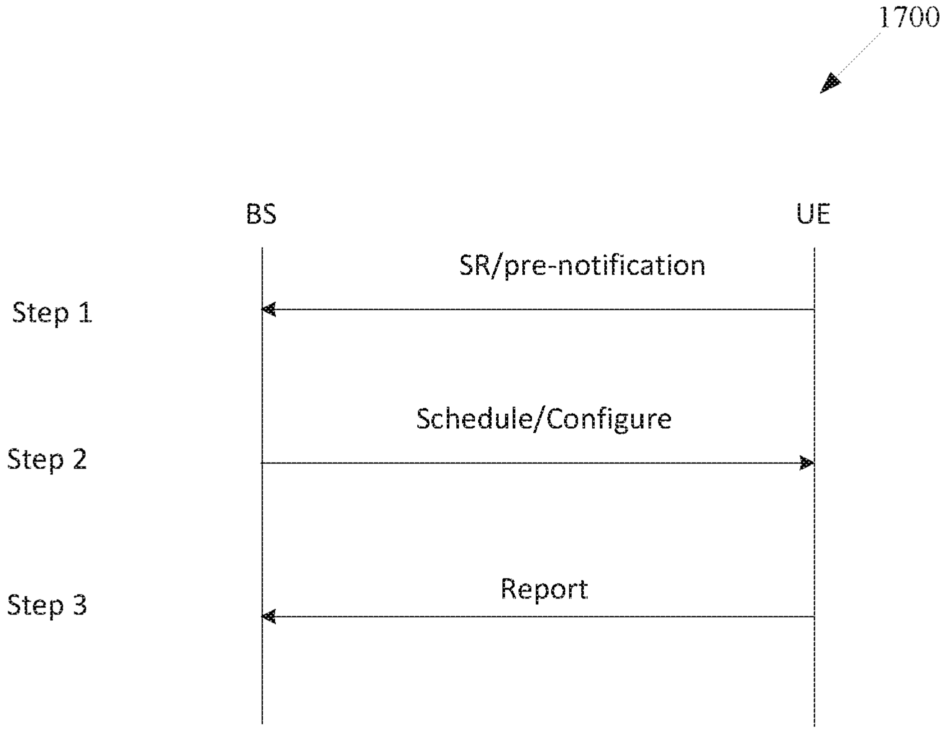
FIG. 17 illustrates an example of signaling flow between a base station and a UE according to embodiments of the present disclosure.

To mitigate, the previously mentioned, latency and/or overhead issues, UE initiated measurement and reporting is considered. The procedure for UE initiated measurement and/or reporting is as illustrated in FIG. 17. In step 1, the UE can send a pre-notification or request signal/channel to the gNB. In step 2, the network can respond with signal providing resources and configuration for transmission of a report that includes measurements performed by the UE. In step 3, the UE provides a report.

FIG. 17 illustrates an example of signaling flow 1700 between a base station and a UE according to embodiments of the present disclosure. An embodiment of the signaling flow 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

One or more of the aforementioned steps can be omitted.

In one example, step 1 is omitted, the base station (gNB) configures and/or activates and/or triggers a report from the UE. In one example, RRC configuration can configured and allocate resources for the UE. In one example, MAC CE (and/or L1 control signaling (e.g., DCI) can activate reporting from the UE. In another example, L1 control signaling (e.g., DCI) (and/or MAC CE signaling) can trigger reporting from the UE. The condition to trigger the report can be up to the network implementation (e.g., based on channel conditions and/or BLER and/or other measurements the gNB may have acquired based on its own measurements and/or measurements of another gNB/base station/TRP and/or measurements from a UE). The configuration/activation/triggering of a report can also include or be associated with configuration/activation/triggering of RS that can be used for measurement.

In one example, step 1 and step 2 are omitted. The UE provides the report without triggering and/or activation by the network and without pre-notification to the network. The network can still configure resources to be used by the UE for such reporting (for example, PUSCH and/or PUCCH and/or RACH resources) as described later in this disclosure. In one example, multiple report configurations are configured, wherein a UE can select a report configuration based on the report payload size and/or the report type.

In one example, step 2 is omitted. The UE provides the network per-notification that the UE may transmit the report and transmits the report without getting activation or triggering from the network. The network can still configure resources to be used by the UE for such reporting (for example, PUSCH and/or PUCCH and/or RACH resources) as described later in this disclosure. The network also configures resources to use for pre-notification as described later in this disclosure.

In one example, step 2 and step 3 are omitted. For example, the SR or pre-notification (step 1) can provide an indication from the UE to the network for the network to perform a certain action. Such action can be for example to perform a beam switch or to perform mobility (e.g., handover) to a target cell. The network configures resources to use for pre-notification as described later in this disclosure In step 3 of FIG. 17, report can be one of: (1) in one example, a one part or one stage report; and (2) in one example a two part or two stage report.

In one example, the report from the UE can be a one-part report (e.g., single stage) or a two-part report (e.g., with two-parts or two stages). Whether to have one-part or two-parts can depend on a condition.

The condition can be based on one or more of the following: (1) depends on amount of UL resources. If there are sufficient uplink resources, two-part UE report is used, else a one-part UE report is used. The threshold to switch between a two-part UE report and a one-part UE can be specified by system specifications and/or configured or updated by RRC signaling and/or MAC CE signaling and/or L1 control (e.g., DCI) signaling; (2) depends on the report type. For example, some report types can be one-part, while other report types can be two-part. This can be based on system specifications and/or configuration or update by RRC signaling and/or MAC CE signaling and/or L1 control (e.g., DCI) signaling. For example, a beam report or a WB CSI report can be configured as one-part report, while a SB-CSI report can be configured as a two-part report; (3) depends on payload size of report. If the payload size is larger than or (larger than or equal to) a threshold two-part report is used, else one-part report is used. The payload size threshold to switch between a two-part UE report and a one-part UE can be specified by system specifications and/or configured or updated by RRC signaling and/or MAC CE signaling and/or L1 control (e.g., DCI) signaling; (4) determined based on UE's implementation; and (5) based on the number possible configurations for the UE report, if the number of configurations is limited (e.g., a small number that can be indicated by the pre-notification), one stage report is used, else two stage report is used, with the first stage indicating a configuration for the second stage.

In one example, a flag or indication in the first stage/part can indicate whether or not there is a second stage/part.

In one example, it can be determined implicitly based on information in the first stage/part whether or not there is a second stage/part (e.g., based on report type and/or report size).

In the present disclosure, a UE initiates a reporting (e.g., step 1 or step 3 of FIG. 17) based on a metric M.

For example, the metric M can be one of the following examples (other examples are also possible): (1) the block error rate; (2) the L1-RSRP and/or L1-SINR and/or L3-RSRP and/or RSRQ of an indicated TCI state; (3) the L1-RSRP and/or L1-SINR and/or L3-RSRP and/or RSRQ of an activated TCI state that is not indicated; (4) the L1-RSRP and/or L1-SINR and/or L3-RSRP and/or RSRQ of TCI state that is not indicated; (5) the L1-RSRP and/or L1-SINR and/or L3-RSRP and/or RSRQ of reference signal; (6) the L1-RSRP and/or L1-SINR and/or L3-RSRP and/or RSRQ of reference signal not associated with an indicated TCI state; (7) the L1-RSRP and/or L1-SINR and/or L3-RSRP and/or RSRQ of TCI state associated with a non-serving cell (e.g., candidate cell or target cell); (8) the L1-RSRP and/or L1-SINR and/or L3-RSRP and/or RSRQ of a non-serving cell (e.g., candidate cell or target cell); (9) difference in time of arrival between an RS and a reference RS. For example, the reference RS can be that of a serving cell or a TRP of a serving cell; (10) CQI metric; (11) difference in CQI metric between measured CQI and (e.g., last) reported CQI; (12) PMI metric; (13) difference in PMI between measured PMI and (e.g., last) reported PMI; (14) RI metric; (15) difference in rank between last measured rank and (e.g., last) reported rank; (16) difference in TDCP between measured TDCP and (e.g., last) reported TDCP; (17) Doppler shift; (18) Doppler spread; (19) difference in Doppler shift between measured Doppler shift and Doppler shift associated with (e.g., last) report; and (20) difference in Doppler spread between measured Doppler spread and Doppler spread associated with (e.g., last) report.

A UE can have a threshold T. Wherein, T can be specified in system specification (e.g., in one example $T=0$) and/or configured and/or updated by RRC signaling and/or MAC CE signaling and/or L1 control (e.g., DCI) signaling. In one example report is initiated by the UE if: (1) $M>T$; (2) $M\geq T$; (3) $M<T$; (4) $M\geq T$; (5) $M=T$; and (6) $M+T$.

A UE can have a first threshold $T_1$ and a second threshold $T_2$. Wherein, $T_1<T_2$, and wherein, $T_1$ and/or $T_2$ can be specified in system specification and/or configured and/or updated by RRC signaling and/or MAC CE signaling and/or L1 control (e.g., DCI) signaling.

In one example $T_1=-T_2$. In one example report is initiated by the UE if one of the following is satisfied: (1) $T_1<M<T_2$; (2) $T_1\leq M<T_2$; (3) $T_1<M\leq T_2$; (4) $T_1\leq M\leq T_2$; (5) $T_1>M$ or $T_2<M$; (6) $T_1>M$ or $T_2<M$; (7) $T_1>M$ or $T_2\leq M$; and (8) $T_1\geq M$ or $T_2\leq M$.

In the present disclosure, the details on the type of UL resource used for UE initiated reporting are provided.

In one example, the UL resource for UE initiated report (e.g., step 3 message of FIG. 17) is Type 1 configured grant PUSCH (CG-PUSCH). In one example, multiple Type 1 CG-PUSCH report configurations are configured, wherein a UE can select a Type 1 CG-PUSCH configuration based on the report payload size and/or the report type.

In one example, the report from the UE is included in a MAC-CE transmitted in Type 1 CG-PUSCH.

In one example, the report from the UE is included in uplink control information (UCI) transmitted in Type 1 CG-PUSCH.

In one example, the report from the UE is single part (single stage) transmission transmitted in Type 1 CG-PUSCH.

In one example, the report from the UE is a two-part (two stage) transmission transmitted in Type 1 CG-PUSCH.

In one example, the first part (first stage) of a report from the UE is included in a first UCI, and the second part (second stage) of a report from the UE is included in a second UCI. In one example, both the first UCI and the second UCI are included in the same transmission instance of Type 1 CG-PUSCH. In one example, the first UCI is included in a first instance of a Type 1 CG-PUSCH, and the second UCI is included in a second instance of a Type 1 CG-PUSCH. In one example, first UCI is included in an UL transmission (e.g., other than Type 1 CG-PUSCH), and the second UCI is included in a Type 1 CG-PUSCH. In one example, the first UCI is included in a Type 1 CG-PUSCH, and the second UCI is included in an UL transmission (e.g., other than Type 1 CG-PUSCH).

In one example, the first part (first stage) of a report from the UE is included in a first MAC CE, and the second part (second stage) of a report from the UE is included in a second MAC CE. In one example, both the first MAC CE and the second MAC CE are included in the same transmission instance of Type 1 CG-PUSCH. In one example, the first MAC CE is included in a first instance of a Type 1 CG-PUSCH, and the second MAC CE is included in a second instance of a Type 1 CG-PUSCH. In one example, first MAC CE is included in an UL transmission (e.g., other than Type 1 CG-PUSCH), and the second MAC CE is included in a Type 1 CG-PUSCH. In one example, the first MAC CE is included in a Type 1 CG-PUSCH, and the second MAC CE is included in an UL transmission (e.g., other than Type 1 CG-PUSCH).

In one example, the first part (first stage) of a report from the UE is included in a UCI, and the second part (second stage) of a report from the UE is included in a MAC CE. In one example, both the UCI and the MAC CE are included in the same transmission instance of Type 1 CG-PUSCH. In one example, the UCI is included in a first instance of a Type 1 CG-PUSCH, and the MAC CE is included in a second instance of a Type 1 CG-PUSCH. In one example, UCI is included in an UL transmission (e.g., other than Type 1 CG-PUSCH), and the MAC CE is included in a Type 1 CG-PUSCH. In one example, the UCI is included in a Type 1 CG-PUSCH, and the MAC CE is included in an UL transmission (e.g., other than Type 1 CG-PUSCH).

In one example, the first part (first stage) of a report from the UE is included in a MAC CE, and the second part (second stage) of a report from the UE is included in a UCI. In one example, both the MAC CE and the UCI are included in the same transmission instance of Type 1 CG-PUSCH. In one example, the MAC CE is included in a first instance of a Type 1 CG-PUSCH, and the UCI is included in a second instance of a Type 1 CG-PUSCH. In one example, MAC CE is included in an UL transmission (e.g., other than Type 1 CG-PUSCH), and the UCI is included in a Type 1 CG-PUSCH. In one example, the MAC CE is included in a Type 1 CG-PUSCH, and the UCI is included in an UL transmission (e.g., other than Type 1 CG-PUSCH).

In one example, a same Type 1 CG-PUSCH configuration is used for multiple report types (e.g., beam report, mobility report, CSI report, TDCP report, time related report, other report). In one example, the report types have a same payload size (e.g., after padding). In one example, the report types can have different payload size.

In one example, a same Type 1 CG-PUSCH configuration is used for multiple report types (e.g., beam report, mobility report, CSI report, TDCP report, time related report, other report). A first stage (or first part) can signal the report type and/or payload size and/or configuration of report.

In one example, a same Type 1 CG-PUSCH configuration is used for multiple report types (e.g., beam report, mobility report, CSI report, TDCP report, time related report, other report). A pre-notification message sent before a transmission instance of a Type 1 CG-PUSCH can indicate the report type and/or payload size and/or configuration of report. In one example, multiple pre-notification configurations are configured, wherein a UE can select a pre-notification configuration based on the report payload size and/or the report type.

In one example, a different Type 1 CG-PUSCH configurations are used for different report types (e.g., beam report, mobility report, CSI report, TDCP report, time related report, other report) and/or payload size. e.g., each report type has an associated Type 1 CG-PUSCH configuration. In one example, a pre-notification can indicate a Type 1 CG-PUSCH configuration. In one example, a Type 1 CG-PUSCH configuration is selected based on the payload size of the report.

In one example, a Type 1 CG-PUSCH transmission instance can multiplex one or more report types (e.g., beam report, mobility report, CSI report, TDCP report, time related report, other report) with no other UL data transmission.

In one example, a Type 1 CG-PUSCH transmission instance can multiplex one or more report types (e.g., beam report, mobility report, CSI report, TDCP report, time related report, other report) with no other UL data transmission. In one example, the report types which can be multiplexed or transmitted in a same transmission instance have a same priority. In one example, the report types which can be multiplexed or transmitted in same transmission instance have a same payload size.

In one example, a Type 1 CG-PUSCH transmission instance can multiplex one or more report types (e.g., beam report, mobility report, CSI report, TDCP report, time related report, other report) with no other UL data transmission. In one example, the report types which can be multiplexed or transmitted in a same transmission instance can have different priorities. In one example, the report types which can be multiplexed or transmitted in a same transmission instance can have different payload sizes.

In one example, a Type 1 CG-PUSCH transmission instance can multiplex one or more report types (e.g., beam report, mobility report, CSI report, TDCP report, time related report, other report) with other UL data transmission.

In one example, a Type 1 CG-PUSCH transmission instance can multiplex one or more report types (e.g., beam report, mobility report, CSI report, TDCP report, time related report, other report) with other UL data transmission. In one example, the report types which can be multiplexed or transmitted in a same transmission instance have a same priority. In one example, the report types which can be multiplexed or transmitted in a same transmission instance have a same payload size.

In one example, a Type 1 CG-PUSCH transmission instance can multiplex one or more report types (e.g., beam report, mobility report, CSI report, TDCP report, time related report, other report) with other UL data transmission. In one example, the report types which can be multiplexed or transmitted in a same transmission instance can have different priorities. In one example, the report types which can be multiplexed or transmitted in a same transmission instance can have different payload sizes.

In one example, a Type 1 CG-PUSCH transmission instance carrying a UE initiated reported can be preceded by a pre-notification signal/channel.

In one example, a Type 1 CG-PUSCH transmission instance carrying a UE initiated reported can be preceded by a pre-notification signal/channel. In one example, the pre-notification TDCP report, time related report, other report) and/or payload size and/or Type 1 CG-PUSCH configuration in the associated Type 1 CG-PUSCH transmission instance.

In one example, the UL resource for UE initiated report (e.g., step 3 message of FIG. 17) is Type 2 configured grant PUSCH (CG-PUSCH). In one example, multiple Type 2 CG-PUSCH report configurations are configured, wherein a UE can select a Type 2 CG-PUSCH configuration based on the report payload size and/or the report type.

In one example, the report from the UE is included in a MAC-CE transmitted in Type 2 CG-PUSCH.

In one example, the report from the UE is included in UCI transmitted in Type 2 CG-PUSCH.

In one example, the report from the UE is single part (single stage) transmission transmitted in Type 2 CG-PUSCH.

In one example, the report from the UE is a two-part (two stage) transmission transmitted in Type 2 CG-PUSCH.

In one example, the first part (first stage) of a report from the UE is included in a first UCI, and the second part (second stage) of a report from the UE is included in a second UCI. In one example, both the first UCI and the second UCI are included in the same transmission instance of Type 2 CG-PUSCH. In one example, the first UCI is included in a first instance of a Type 2 CG-PUSCH, and the second UCI is included in a second instance of a Type 2 CG-PUSCH. In one example, first UCI is included in an UL transmission (e.g., other than Type 2 CG-PUSCH), and the second UCI is included in a Type 2 CG-PUSCH. In one example, the first UCI is included in a Type 2 CG-PUSCH, and the second UCI is included in an UL transmission (e.g., other than Type 2 CG-PUSCH).

In one example, the first part (first stage) of a report from the UE is included in a first MAC CE, and the second part (second stage) of a report from the UE is included in a second MAC CE. In one example, both the first MAC CE and the second MAC CE are included in the same transmission instance of Type 2 CG-PUSCH. In one example, the first MAC CE is included in a first instance of a Type 2 CG-PUSCH, and the second MAC CE is included in a second instance of a Type 2 CG-PUSCH. In one example, first MAC CE is included in an UL transmission (e.g., other than Type 2 CG-PUSCH), and the second MAC CE is included in a Type 2 CG-PUSCH. In one example, the first MAC CE is included in a Type 2 CG-PUSCH, and the second MAC CE is included in an UL transmission (e.g., other than Type 2 CG-PUSCH).

In one example, the first part (first stage) of a report from the UE is included in a UCI, and the second part (second stage) of a report from the UE is included in a MAC CE. In one example, both the UCI and the MAC CE are included in the same transmission instance of Type 2 CG-PUSCH. In one example, the UCI is included in a first instance of a Type 2 CG-PUSCH, and the MAC CE is included in a second instance of a Type 2 CG-PUSCH. In one example, UCI is included in an UL transmission (e.g., other than Type 2 CG-PUSCH), and the MAC CE is included in a Type 2 CG-PUSCH. In one example, the UCI is included in a Type 2 CG-PUSCH, and the MAC CE is included in an UL transmission (e.g., other than Type 2 CG-PUSCH).

In one example, the first part (first stage) of a report from the UE is included in a MAC CE, and the second part (second stage) of a report from the UE is included in a UCI. In one example, both the MAC CE and the UCI are included in the same transmission instance of Type 2 CG-PUSCH. In one example, the MAC CE is included in a first instance of a Type 2 CG-PUSCH, and the UCI is included in a second instance of a Type 2 CG-PUSCH. In one example, MAC CE is included in an UL transmission (e.g., other than Type 2 CG-PUSCH), and the UCI is included in a Type 2 CG-PUSCH. In one example, the MAC CE is included in a Type 2 CG-PUSCH, and the UCI is included in an UL transmission (e.g., other than Type 2 CG-PUSCH).

In one example, a same Type 2 CG-PUSCH configuration is used for multiple report types (e.g., beam report, mobility report, CSI report, TDCP report, time related report, other report). In one example, the report types have a same payload size (e.g., after padding). In one example, the report types can have different payload size.

In one example, a same Type 2 CG-PUSCH configuration is used for multiple report types (e.g., beam report, mobility report, CSI report, TDCP report, time related report, other report). A first stage (or first part) can signal the report type and/or payload size and/or configuration of report.

In one example, a same Type 2 CG-PUSCH configuration is used for multiple report types (e.g., beam report, mobility report, CSI report, TDCP report, time related report, other report). A pre-notification message sent before a transmission instance of a Type 2 CG-PUSCH can indicate the report type and/or payload size and/or configuration of report. In one example, multiple pre-notification configurations are configured, wherein a UE can select a pre-notification configuration based on the report payload size and/or the report type.

In one example, a different Type 2 CG-PUSCH configurations are used for different report types (e.g., beam report, mobility report, CSI report, TDCP report, time related report, other report) and/or payload size. e.g., each report type has an associated Type 2 CG-PUSCH configuration. In one example, a pre-notification can indicate a Type 2 CG-PUSCH configuration. In one example, a Type 2 CG-PUSCH configuration is selected based on the payload size of the report.

In one example, a Type 2 CG-PUSCH transmission instance can multiplex one or more report types (e.g., beam report, mobility report, CSI report, TDCP report, time related report, other report) with no other UL data transmission.

In one example, a Type 2 CG-PUSCH transmission instance can multiplex one or more report types (e.g., beam report, mobility report, CSI report, TDCP report, time related report, other report) with no other UL data transmission. In one example, the report types which can be multiplexed or transmitted in a same transmission instance have a same priority. In one example, the report types which can be multiplexed or transmitted in a same transmission instance have a same payload size.

In one example, a Type 2 CG-PUSCH transmission instance can multiplex one or more report types (e.g., beam report, mobility report, CSI report, TDCP report, time related report, other report) with no other UL data transmission. In one example, the report types which can be multiplexed or transmitted in a same transmission instance can have different priorities. In one example, the report types which can be multiplexed or transmitted in a same transmission instance can have different payload sizes.

In one example, a Type 2 CG-PUSCH transmission instance can multiplex one or more report types (e.g., beam report, mobility report, CSI report, TDCP report, time related report, other report) with other UL data transmission.

In one example, a Type 2 CG-PUSCH transmission instance can multiplex one or more report types (e.g., beam report, mobility report, CSI report, TDCP report, time related report, other report) with other UL data transmission. In one example, the report types which can be multiplexed or transmitted in a same transmission instance have a same priority. In one example, the report types which can be multiplexed or transmitted in a same transmission instance have a same payload size.

In one example, a Type 2 CG-PUSCH transmission instance can multiplex one or more report types (e.g., beam report, mobility report, CSI report, TDCP report, time related report, other report) with other UL data transmission. In one example, the report types which can be multiplexed or transmitted in a same transmission instance can have different priorities. In one example, the report types which can be multiplexed or transmitted in a same transmission instance can have different payload sizes.

In one example, a Type 2 CG-PUSCH transmission instance carrying a UE initiated reported can be preceded by a pre-notification signal/channel. In one example, multiple pre-notification configurations are configured, wherein a UE can select a pre-notification configuration based on the report payload size and/or the report type.

In one example, a Type 2 CG-PUSCH transmission instance carrying a UE initiated reported can be preceded by a pre-notification signal/channel. In one example, the pre-notification signal/channel can indicate the report type or types (e.g., beam report, mobility report, CSI report, TDCP report, time related report, other report) and/or payload size and/or Type 2 CG-PUSCH configuration in the associated Type 2 CG-PUSCH transmission instance.

In one example, a UE can transmit a scheduling request to the network to activate Type 2 CG-PUSCH for UE initiated reporting. In one example, multiple scheduling request configurations are configured, wherein a UE can select a scheduling request configuration based on the report payload size and/or the report type.

In one example, a UE can transmit a scheduling request to the network to activate Type 2 CG-PUSCH for UE initiated reporting. A scheduling request can be common for all report types (e.g., beam report, mobility report, CSI report, TDCP report, time related report, other report).

In one example, a UE can transmit a scheduling request to the network to activate Type 2 CG-PUSCH for UE initiated reporting. A scheduling request can apply to more than one report type (e.g., beam report, mobility report, CSI report, TDCP report, time related report, other report). In one example, the report types to which the scheduling request applies have a same priority. In one example, the report types to which the scheduling request applies can have different priorities. In one example, the report types to which the scheduling request applies have a same payload size. In one example, the report types to which the scheduling request applies can have different payload sizes. In one example, there are multiple scheduling request configuration for the different report types and/or payload size and/or Type 2 CG-PUSCH configuration.

In one example, a UE can transmit a scheduling request to the network to activate Type 2 CG-PUSCH for UE initiated reporting. A scheduling can apply to one report type and/or payload size and/or Type 2 CG-PUSCH configuration.

In one example, the scheduling request sent from the UE activates the Type 2 CG-PUSCH for UE initiated reporting. No further activation is performed by network.

In one example, the scheduling request sent from the UE requests the activation of the Type 2 CG-PUSCH for UE initiated reporting. The network further transmits a signal to activate the Type 2 CG-PUSCH. The signal from the network can be transmitted by MAC CE and/or DCI.

In one example, a UE can transmit a scheduling request to the network to de-activate Type 2 CG-PUSCH for UE initiated reporting.

In one example, a UE can transmit a scheduling request to the network to de-activate Type 2 CG-PUSCH for UE initiated reporting. A scheduling request can be common for all report types (e.g., beam report, mobility report, CSI report, TDCP report, time related report, other report).

In one example, a UE can transmit a scheduling request to the network to de-activate Type 2 CG-PUSCH for UE initiated reporting. A scheduling request can apply to more than one report type (e.g., beam report, mobility report, CSI report, TDCP report, time related report, other report). In one example, the report types to which the scheduling request applies have a same priority. In one example, the report types to which the scheduling request applies can have different priorities. In one example, the report types to which the scheduling request applies have a same payload size. In one example, the report types to which the scheduling request applies can have different payload sizes.

In one example, a UE can transmit a scheduling request to the network to de-activate Type 2 CG-PUSCH for UE initiated reporting. A scheduling can apply to one report type.

In one example, the scheduling request sent from the UE deactivates the Type 2 CG-PUSCH for UE initiated reporting. No further deactivation is performed by network.

In one example, the scheduling request sent from the UE requests the deactivation of the Type 2 CG-PUSCH for UE initiated reporting. The network further transmits a signal to deactivate the Type 2 CG-PUSCH. The signal from the network can be transmitted by MAC CE and/or DCI.

In one example, if a UE does not transmit a report on instance of an activated Type 2 CG-PUSCH for a time T, the network can deactivate the Type 2 CG-PUSCH. Wherein, T can be specified in system specification (e.g., in one example T=0) and/or configured and/or updated by RRC signaling and/or MAC CE signaling and/or L1 control (e.g., DCI) signaling.

In one example, the UL resource for UE initiated report (e.g., step 3 message of FIG. 17) is a dynamic grant PUSCH (DG-PUSCH). In one example, multiple DG-PUSCH report configurations are configured, wherein a UE can select a DG-PUSCH configuration based on the report payload size and/or the report type.

In one example, the report from the UE is included in a MAC-CE transmitted in a DG-PUSCH.

In one example, the report from the UE is included in UCI transmitted in a DG-PUSCH.

In one example, the report from the UE is single part (single stage) transmission transmitted in a DG-PUSCH.

In one example, the report from the UE is a two-part (two stage) transmission transmitted in a DG-PUSCH.

In one example, the first part (first stage) of a report from the UE is included in a first UCI, and the second part (second stage) of a report from the UE is included in a second UCI. In one example, both the first UCI and the second UCI are included in the same transmission instance of a DG-PUSCH. In one example, the first UCI is included in a first instance of a DG-PUSCH, and the second UCI is included in a second instance of a DG-PUSCH. In one example, first UCI is included in an UL transmission (e.g., other than DG-PUSCH), and the second UCI is included in a DG-PUSCH. In one example, the first UCI is included in a DG-PUSCH, and the second UCI is included in an UL transmission (e.g., other than DG-PUSCH).

In one example, the first part (first stage) of a report from the UE is included in a first MAC CE, and the second part (second stage) of a report from the UE is included in a second MAC CE. In one example, both the first MAC CE and the second MAC CE are included in the same transmission instance of a DG-PUSCH. In one example, the first MAC CE is included in a first instance of a DG-PUSCH, and the second MAC CE is included in a second instance of a DG-PUSCH. In one example, first MAC CE is included in an UL transmission (e.g., other than DG-PUSCH), and the second MAC CE is included in a DG-PUSCH. In one example, the first MAC CE is included in a DG-PUSCH, and the second MAC CE is included in an UL transmission (e.g., other than DG-PUSCH).

In one example, the first part (first stage) of a report from the UE is included in a UCI, and the second part (second stage) of a report from the UE is included in a MAC CE. In one example, both the UCI and the MAC CE are included in the same transmission instance of a DG-PUSCH. In one example, the UCI is included in a first instance of a DG-PUSCH, and the MAC CE is included in a second instance of a DG-PUSCH. In one example, UCI is included in an UL transmission (e.g., other than DG-PUSCH), and the MAC CE is included in a DG-PUSCH. In one example, the UCI is included in a DG-PUSCH, and the MAC CE is included in an UL transmission (e.g., other than DG-PUSCH).

In one example, the first part (first stage) of a report from the UE is included in a MAC CE, and the second part (second stage) of a report from the UE is included in a UCI. In one example, both the MAC CE and the UCI are included in the same transmission instance of a DG-PUSCH. In one example, the MAC CE is included in a first instance of a DG-PUSCH, and the UCI is included in a second instance of a DG-PUSCH. In one example, MAC CE is included in an UL transmission (e.g., other than DG-PUSCH), and the UCI is included in a DG-PUSCH. In one example, the MAC CE is included in a DG-PUSCH, and the UCI is included in an UL transmission (e.g., other than DG-PUSCH).

In one example, a same DG-PUSCH transmission instance (or configuration) can be used for multiple report types (e.g., beam report, mobility report, CSI report, TDCP report, time related report, other report). In one example, the report types have a same payload size (e.g., after padding). In one example, the report types can have different payload size.

In one example, a same DG-PUSCH transmission instance (or configuration) can be used for multiple report types (e.g., beam report, mobility report, CSI report, TDCP report, time related report, other report). A first stage (or first part) can signal the report type and/or payload size and/or configuration of report.

In one example, a same DG-PUSCH transmission instance (or configuration) is used for multiple report types (e.g., beam report, mobility report, CSI report, TDCP report, time related report, other report). A pre-notification message or scheduling request sent before a transmission instance of a DG-PUSCH can indicate the report type and/or payload size and/or configuration of report. In one example, multiple scheduling request configurations or pre-notification configurations are configured, wherein a UE can select a scheduling request configuration or pre-notification configuration based on the report payload size and/or the report type.

In one example, a different DG-PUSCH transmission instances are used for different report types (e.g., beam report, mobility report, CSI report, TDCP report, time related report, other report) and/or payload size. e.g., each report type has an associated DG-PUSCH transmission instance. In one example, a pre-notification can indicate a DG-PUSCH configuration. In one example, a DG-PUSCH configuration is selected based on the payload size of the report.

In one example, a different DG-PUSCH transmission instances are used for different report types (e.g., beam report, mobility report, CSI report, TDCP report, time related report, other report). e.g., each report type has an associated DG-PUSCH transmission instance. A pre-notification message or scheduling request sent before a transmission instance of a DG-PUSCH can indicate the report type and/or payload size and/or configuration of report.

In one example, a DG-PUSCH transmission instance can multiplex one or more report types (e.g., beam report, mobility report, CSI report, TDCP report, time related report, other report) with no other UL data transmission.

In one example, a DG-PUSCH transmission instance can multiplex one or more report types (e.g., beam report, mobility report, CSI report, TDCP report, time related report, other report) with no other UL data transmission. In one example, the report types which can be multiplexed or transmitted in a same transmission instance have a same priority. In one example, the report types which can be multiplexed or transmitted in a same transmission instance have a same payload size.

In one example, a DG-PUSCH transmission instance can multiplex one or more report types (e.g., beam report, mobility report, CSI report, TDCP report, time related report, other report) with no other UL data transmission. In one example, the report types which can be multiplexed or transmitted in a same transmission instance can have different priorities. In one example, the report types which can be multiplexed or transmitted in a same transmission instance can have different payload sizes.

In one example, a DG-PUSCH transmission instance can multiplex one or more report types (e.g., beam report, mobility report, CSI report, TDCP report, time related report, other report) with other UL data transmission.

In one example, a DG-PUSCH transmission instance can multiplex one or more report types (e.g., beam report, mobility report, CSI report, TDCP report, time related report, other report) with other UL data transmission. In one example, the report types which can be multiplexed or transmitted in a same transmission instance have a same priority. In one example, the report types which can be multiplexed or transmitted in a same transmission instance have a same payload size.

In one example, a DG-PUSCH transmission instance can multiplex one or more report types (e.g., beam report, mobility report, CSI report, TDCP report, time related report, other report) with other UL data transmission. In one example, the report types which can be multiplexed or transmitted in a same transmission instance can have different priorities. In one example, the report types which can be multiplexed or transmitted in a same transmission instance can have different payload sizes.

In one example, a DG-PUSCH transmission instance carrying a UE initiated reported can be preceded by a pre-notification signal/channel. The UE transmission DG-PUSCH, without scheduling grant from the network (e.g., UE autonomously triggered). The pre-notification signal/channel is to alert/inform the gNB/TRP/network of an upcoming DG-PUSCH transmission instance.

In one example, a DG-PUSCH transmission instance carrying a UE initiated reported can be preceded by a pre-notification signal/channel. The UE transmission DG-PUSCH, without scheduling grant from the network. The pre-notification signal/channel is to alert/inform the gNB/TRP/network of an upcoming DG-PUSCH transmission instance. In one example, the pre-notification signal/channel can indicate the report type or types (e.g., beam report, mobility report, CSI report, TDCP report, time related report, other report) and/or payload size and/or DG-PUSCH configuration in the associated DG-PUSCH transmission instance.

In one example, a DG-PUSCH transmission instance carrying a UE initiated reported can be preceded by a pre-notification signal/channel. The UE transmission DG-PUSCH, without scheduling grant from the network. The pre-notification signal/channel is to alert/inform the gNB/TRP/network of an upcoming DG-PUSCH transmission instance. In one example, the pre-notification signal/channel can be for N DG-PUSCH transmission instances. Wherein, N can be specified in specifications and/or configured or updated by higher layer signaling (e.g., RRC signaling and/or MAC CE signaling) and/or configured by L1 control signaling (e.g., DCI signaling) and/or included or signaled in the pre-notification message. The N DG-PUSCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the pre-notification message.

In one example, a UE can transmit a scheduling request to the network for the network to schedule a DG-PUSCH for UE initiated reporting. In one example the DG-PUSCH only includes one or more UE initiated reports, with no other UL data. In one example the DG-PUSCH includes one or more UE initiated reports and can include other UL data.

In one example, a UE can transmit a scheduling request to the network for the network to schedule a DG-PUSCH for UE initiated reporting. A scheduling request can be common for all report types (e.g., beam report, mobility report, CSI report, TDCP report, time related report, other report).

In one example, a UE can transmit a scheduling request to the network for the network to schedule a DG-PUSCH for UE initiated reporting. A scheduling request can apply to more than one report type (e.g., beam report, mobility report, CSI report, TDCP report, time related report, other report). In one example, the report types to which the scheduling request applies have a same priority. In one example, the scheduling request is associated with a report configuration or report payload size, the UE can select a scheduling request based on the payload size or configuration of the report.

In one example, the report types to which the scheduling request applies can have different priorities. In one example, the report types to which the scheduling request applies have a same payload size. In one example, the report types to which the scheduling request applies can have different payload sizes. In one example, the UE can select a scheduling request based on the payload size or configuration of the report.

In one example, a UE can transmit a scheduling request to the network for the network to schedule a DG-PUSCH for UE initiated reporting. A scheduling can apply to one report type.

In one example, a UE can transmit a scheduling request to the network for the network to schedule a DG-PUSCH for UE initiated reporting. In one example, the scheduling request can be for N DG-PUSCH transmission instances. Wherein, N can be specified in specifications and/or configured or updated by higher layer signaling (e.g., RRC signaling and/or MAC CE signaling) and/or configured by L1 control signaling (e.g., DCI signaling) and/or included or signaled in the scheduling request. The N DG-PUSCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the scheduling request.

In one example, a UE can transmit a scheduling request to the network for the network to schedule a DG-PUSCH for UE initiated reporting. In response the network sends a scheduling grant to the UE. In one example, the scheduling grant can be for N DG-PUSCH transmission instances. Wherein, N can be specified in specifications and/or configured or updated by higher layer signaling (e.g., RRC signaling and/or MAC CE signaling) and/or configured by L1 control signaling (e.g., DCI signaling) and/or included or signaled in the scheduling grant. The N DG-PUSCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the scheduling grant.

In one example, the network can transmit a scheduling grant to UE to transmit a report.

In one example, the network can transmit a scheduling grant to UE to transmit a report. In one example, the scheduling grant is for a report that only includes one or more UE initiated reports, with no other UL data. In one example, the resources allocated in the scheduling grant are based on the payload size of the report (e.g., as indicated by the UE).

In one example, the network can transmit a scheduling grant to UE to transmit a report. In one example, the scheduling grant is for a report that includes one or more UE initiated reports, with other UL data.

In one example, the network can transmit a scheduling grant to UE. In one example, the scheduling grant is for UL data, and the UE can use the scheduling grant to transmit one or more UE initiated reports.

In one example, the network can transmit a scheduling grant to UE to transmit a report. In one example, the scheduling grant can be for N DG-PUSCH transmission instances. Wherein, N can be specified in specifications and/or configured or updated by higher layer signaling (e.g., RRC signaling and/or MAC CE signaling) and/or configured by L1 control signaling (e.g., DCI signaling) and/or included or signaled in the scheduling grant. The N DG-PUSCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the scheduling grant.

In one example, the UL resource for UE initiated report (e.g., step 3 message of FIG. 17) is periodic PUCCH. In one example, multiple periodic PUCCH report configurations are configured, wherein a UE can select a periodic PUCCH configuration based on the report payload size and/or the report type.

In one example, the network configures the periodic PUCCH resources by higher layer signaling (e.g., RRC signaling).

In one example, the network configures the periodic PUCCH resources by higher layer signaling (e.g., RRC signaling). The UE can transmit a signal in the uplink to adapt (or request the adaptation of) the PUCCH resources (e.g., adapt the periodicity of the PUCCH resources or adapted the allocated resources per instance of PUCCH). In one example, the signal to adapt the periodicity of PUCCH resources is a PUCCH transmission. In one example, the signal to adapt the periodicity of PUCCH resources is a PUSCH transmission. In one example, the signal to adapt the periodicity of PUCCH resources is a PRACH transmission.

In one example, the report from the UE is included in UCI transmitted in a periodic PUCCH.

In one example, the report from the UE is single part (single stage) transmission transmitted in a periodic PUCCH.

In one example, the report from the UE is a two-part (two stage) transmission transmitted in a periodic PUCCH.

In one example, the first part (first stage) of a report from the UE is included in a first UCI, and the second part (second stage) of a report from the UE is included in a second UCI. In one example, both the first UCI and the second UCI are included in the same transmission instance of periodic PUCCH. In one example, the first UCI is included in a first instance of a periodic PUCCH, and the second UCI is included in a second instance of a periodic PUCCH. In one example, first UCI is included in an UL transmission (e.g., other than a periodic PUCCH), and the second UCI is included in a periodic PUCCH. In one example, the first UCI is included in a periodic PUCCH, and the second UCI is included in an UL transmission (e.g., other than a periodic PUCCH).

In one example, a same periodic PUCCH configuration is used for multiple report types (e.g., beam report, mobility report, CSI report, TDCP report, time related report, other report). In one example, the report types have a same payload size (e.g., after padding). In one example, the report types can have different payload size.

In one example, a same periodic PUCCH configuration is used for multiple report types (e.g., beam report, mobility report, CSI report, TDCP report, time related report, other report). A first stage (or first part) can signal the report type and/or payload size and/or configuration of report.

In one example, a same periodic PUCCH configuration is used for multiple report types (e.g., beam report, mobility report, CSI report, TDCP report, time related report, other report). A pre-notification message sent before a transmission instance of a periodic PUCCH can indicate the report type and/or payload size and/or configuration of report.

In one example, different periodic PUCCH configurations are used for different report types (e.g., beam report, mobility report, CSI report, TDCP report, time related report, other report) and/or payload size. e.g., each report type has an associated periodic configuration. In one example, a pre-notification can indicate a periodic PUCCH configuration. In one example, a periodic PUCCH configuration is selected based on the payload size of the report.

In one example, a periodic PUCCH transmission instance can multiplex one or more report types (e.g., beam report, mobility report, CSI report, TDCP report, time related report, other report) with no other UL control information.

In one example, a periodic PUCCH transmission instance can multiplex one or more report types (e.g., beam report, mobility report, CSI report, TDCP report, time related report, other report) with no other UL control information. In one example, the report types which can be multiplexed or transmitted in a same transmission instance have a same priority. In one example, the report types which can be multiplexed or transmitted in a same transmission instance have a same payload size.

In one example, a periodic PUCCH transmission instance can multiplex one or more report types (e.g., beam report, mobility report, CSI report, TDCP report, time related report, other report) with no other UL control information. In one example, the report types which can be multiplexed or transmitted in a same transmission instance can have different priorities. In one example, the report types which can be multiplexed or transmitted in a same transmission instance can have different payload sizes.

In one example, a periodic PUCCH transmission instance can multiplex one or more report types (e.g., beam report, mobility report, CSI report, TDCP report, time related report, other report) with other UL control information.

In one example, a periodic PUCCH transmission instance can multiplex one or more report types (e.g., beam report, mobility report, CSI report, TDCP report, time related report, other report) with other UL control information. In one example, the report types which can be multiplexed or transmitted in a same transmission instance have a same priority. In one example, the report types which can be multiplexed or transmitted in a same transmission instance have a same payload size.

In one example, a periodic PUCCH transmission instance can multiplex one or more report types (e.g., beam report, mobility report, CSI report, TDCP report, time related report, other report) with other UL control information. In one example, the report types which can be multiplexed or transmitted in a same transmission instance can have different priorities. In one example, the report types which can be multiplexed or transmitted in a same transmission instance can have different payload sizes.

In one example, a periodic PUCCH transmission instance carrying a UE initiated reported can be preceded by a pre-notification signal/channel. In one example, multiple pre-notification configurations are configured, wherein a UE can select a pre-notification configuration based on the report payload size and/or the report type.

In one example, a periodic PUCCH transmission instance carrying a UE initiated reported can be preceded by a pre-notification signal/channel. In one example, the pre-notification TDCP report, time related report, other report) and/or payload size and/or periodic PUCCH configuration in the associated periodic PUCCH transmission instance.

In one example, the UL resource for UE initiated report (e.g., step 3 message of FIG. 17) is semi-persistent PUCCH. In one example, multiple semi-persistent PUCCH report configurations are configured, wherein a UE can select a semi-persistent configuration based on the report payload size and/or the report type.

In one example, the network configures the semi-persistent PUCCH resources by higher layer signaling (e.g., RRC signaling). The network can activate the semi-persistent PUCCH, after which the UE can start transmitting semi-persistent PUCCH. The network can de-activate the semi-persistent PUCCH, after which the UE stops transmitting semi-persistent PUCCH.

In one example, the network configures the semi-persistent PUCCH resources by higher layer signaling (e.g., RRC signaling). The network can activate the semi-persistent PUCCH, after which the UE can start transmitting semi-persistent PUCCH. The network can de-activate the semi-persistent PUCCH, after which the UE stops transmitting semi-persistent PUCCH. The UE can transmit a signal in the uplink to adapt (or request the adaptation of) the PUCCH resources (e.g., adapt the periodicity of the PUCCH resources or adapted the allocated resources per instance of PUCCH). In one example, the signal to adapt the periodicity of PUCCH resources is a PUCCH transmission. In one example, the signal to adapt the periodicity of PUCCH resources is a PUSCH transmission. In one example, the signal to adapt the periodicity of PUCCH resources is a PRACH transmission.

In one example, the network configures the semi-persistent PUCCH resources by higher layer signaling (e.g., RRC signaling). The UE can transmit a signal in the uplink to activate the semi-persistent PUCCH. In one example, the signal to activate the PUCCH is a PUCCH transmission. In one example, the signal to activate the PUCCH is a PUSCH transmission. In one example, the signal to activate the PUCCH is a PRACH transmission. In one example, multiple activation signals associated with different report configurations or report payload size are configured, the UE can select an activation signal based on the payload size or configuration of the report.

In one example, the network configures the semi-persistent PUCCH resources by higher layer signaling (e.g., RRC signaling). The UE can transmit a signal in the uplink to trigger the network activation of the semi-persistent PUCCH. The network transmits a signal to the UE to activate the semi-persistent PUCCH. In one example, the signal to trigger the activation of the PUCCH is a PUCCH transmission. In one example, the signal to trigger the activation of the PUCCH is a PUSCH transmission. In one example, the signal to trigger the activation of the PUCCH is a PRACH transmission. In one example, multiple triggering signals associated with different report configurations or report payload size are configured, the UE can select a triggering signal based on the payload size or configuration of the report.

In one example, the network configures the semi-persistent PUCCH resources by higher layer signaling (e.g., RRC signaling). The UE can transmit a signal in the uplink to deactivate the semi-persistent PUCCH. In one example, the signal to deactivate the PUCCH is a PUCCH transmission. In one example, the signal to deactivate the PUCCH is a PUSCH transmission. In one example, the signal to deactivate the PUCCH is a PRACH transmission.

In one example, the network configures the semi-persistent PUCCH resources by higher layer signaling (e.g., RRC signaling). The UE can transmit a signal in the uplink to trigger the network deactivation of the semi-persistent PUCCH. The network transmits a signal to the UE to deactivate the semi-persistent PUCCH. In one example, the signal to trigger the deactivation of the PUCCH is a PUCCH transmission. In one example, the signal to trigger the deactivation of the PUCCH is a PUSCH transmission. In one example, the signal to trigger the deactivation of the PUCCH is a PRACH transmission.

In one example, the report from the UE is included in UCI transmitted in a semi-persistent PUCCH.

In one example, the report from the UE is single part (single stage) transmission transmitted in a semi-persistent PUCCH.

In one example, the report from the UE is a two-part (two stage) transmission transmitted in a semi-persistent PUCCH.

In one example, the first part (first stage) of a report from the UE is included in a first UCI, and the second part (second stage) of a report from the UE is included in a second UCI. In one example, both the first UCI and the second UCI are included in the same transmission instance of semi-persistent PUCCH. In one example, the first UCI is included in a first instance of a semi-persistent PUCCH, and the second UCI is included in a second instance of a semi-persistent PUCCH. In one example, first UCI is included in an UL transmission (e.g., other than a semi-persistent PUCCH), and the second UCI is included in a semi-persistent PUCCH. In one example, the first UCI is included in a semi-persistent PUCCH, and the second UCI is included in an UL transmission (e.g., other than a semi-persistent PUCCH).

In one example, a same semi-persistent PUCCH configuration is used for multiple report types (e.g., beam report, mobility report, CSI report, TDCP report, time related report, other report). In one example, the report types have a same payload size (e.g., after padding). In one example, the report types can have different payload size.

In one example, a semi-persistent periodic PUCCH configuration is used for multiple report types (e.g., beam report, mobility report, CSI report, TDCP report, time related report, other report). A first stage (or first part) can signal the report type and/or payload size and/or configuration of report.

In one example, a same semi-persistent PUCCH configuration is used for multiple report types (e.g., beam report, mobility report, CSI report, TDCP report, time related report, other report). A pre-notification message sent before a transmission instance of a semi-persistent PUCCH can indicate the report type and/or payload size and/or configuration of report. In one example, multiple pre-notification configurations are configured, wherein a UE can select a pre-notification configuration based on the report payload size and/or the report type.

In one example, different semi-persistent PUCCH configurations are used for different report types (e.g., beam report, mobility report, CSI report, TDCP report, time related report, other report) and/or payload size. e.g., each report type has an associated semi-persistent configuration. In one example, a pre-notification can indicate a semi-persistent PUCCH configuration. In one example, a semi-persistent PUCCH configuration is selected based on the payload size of the report.

In one example, a semi-persistent PUCCH transmission instance can multiplex one or more report types (e.g., beam report, mobility report, CSI report, TDCP report, time related report, other report) with no other UL control information.

In one example, a semi-persistent PUCCH transmission instance can multiplex one or more report types (e.g., beam report, mobility report, CSI report, TDCP report, time related report, other report) with no other UL control information. In one example, the report types which can be multiplexed or transmitted in a same transmission instance have a same priority. In one example, the report types which can be multiplexed or transmitted in a same transmission instance have a same payload size.

In one example, a semi-persistent PUCCH transmission instance can multiplex one or more report types (e.g., beam report, mobility report, CSI report, TDCP report, time related report, other report) with no other UL control information. In one example, the report types which can be multiplexed or transmitted in a same transmission instance can have different priorities. In one example, the report types which can be multiplexed or transmitted in a same transmission instance can have different payload sizes.

In one example, a semi-persistent PUCCH transmission instance can multiplex one or more report types (e.g., beam report, mobility report, CSI report, TDCP report, time related report, other report) with other UL control information.

In one example, a periodic PUCCH transmission instance can multiplex one or more report types (e.g., beam report, mobility report, CSI report, TDCP report, time related report, other report) with other UL control information. In one example, the report types which can be multiplexed or transmitted in a same transmission instance have a same priority. In one example, the report types which can be multiplexed or transmitted in a same transmission instance have a same payload size.

In one example, a semi-persistent PUCCH transmission instance can multiplex one or more report types (e.g., beam report, mobility report, CSI report, TDCP report, time related report, other report) with other UL control information. In one example, the report types which can be multiplexed or transmitted in a same transmission instance can have different priorities. In one example, the report types which can be multiplexed or transmitted in a same transmission instance can have different payload sizes.

In one example, a semi-persistent PUCCH transmission instance carrying a UE initiated reported can be preceded by a pre-notification signal/channel. In one example, multiple pre-notification configurations are configured, wherein a UE can select a pre-notification configuration based on the report payload size and/or the report type.

In one example, a semi-persistent PUCCH transmission instance carrying a UE initiated reported can be preceded by a pre-notification signal/channel. In one example, the pre-notification TDCP report, time related report, other report) and/or payload size and/or semi-persistent PUCCH configuration in the associated semi-persistent PUCCH transmission instance.

In one example, a UE can transmit a scheduling request to the network to activate semi-persistent PUCCH for UE initiated reporting. In one example, multiple scheduling requests associated with different report configurations or report payload size are configured, the UE can select a scheduling request based on the payload size or configuration of the report.

In one example, a UE can transmit a scheduling request to the network to activate semi-persistent PUCCH for UE initiated reporting. A scheduling request can be common for all report types (e.g., beam report, mobility report, CSI report, TDCP report, time related report, other report).

In one example, a UE can transmit a scheduling request to the network to activate semi-persistent PUCCH for UE initiated reporting. A scheduling request can apply to more than one report type (e.g., beam report, mobility report, CSI report, TDCP report, time related report, other report). In one example, the report types to which the scheduling request applies have a same priority. In one example, the report types to which the scheduling request applies can have different priorities. In one example, the report types to which the scheduling request applies have a same payload size. In one example, the report types to which the scheduling request applies can have different payload sizes. In one example, the scheduling request indicates the priority of the report. In one example, the scheduling request indicates the payload size of the report.

In one example, a UE can transmit a scheduling request to the network to activate semi-persistent PUCCH for UE initiated reporting. A scheduling can apply to one report type.

In one example, the scheduling request sent from the UE activates the semi-persistent PUCCH for UE initiated reporting. No further activation is performed by network.

In one example, the scheduling request sent from the UE requests the activation of the semi-persistent PUCCH for UE initiated reporting. The network further transmits a signal to activate the semi-persistent PUCCH. The signal from the network can be transmitted by MAC CE and/or DCI.

In one example, a UE can transmit a scheduling request to the network to de-activate semi-persistent PUCCH for UE initiated reporting.

In one example, a UE can transmit a scheduling request to the network to de-activate semi-persistent PUCCH for UE initiated reporting. A scheduling request can be common for all report types (e.g., beam report, mobility report, CSI report, TDCP report, time related report, other report).

In one example, a UE can transmit a scheduling request to the network to de-activate semi-persistent PUCCH for UE initiated reporting. A scheduling request can apply to more than one report type (e.g., beam report, mobility report, CSI report, TDCP report, time related report, other report). In one example, the report types to which the scheduling request applies have a same priority and/or payload size and/or semi-persistent PUCCH. In one example, the report types to which the scheduling request applies can have different priorities. In one example, the report types to which the scheduling request applies have a same payload size. In one example, the report types to which the scheduling request applies can have different payload sizes. In one example, the scheduling request indicates the priority of the report. In one example, the scheduling request indicates the payload size of the report.

In one example, a UE can transmit a scheduling request to the network to de-activate semi-persistent PUCCH for UE initiated reporting. A scheduling can apply to one report type.

In one example, the scheduling request sent from the UE deactivates the semi-persistent PUCCH for UE initiated reporting. No further deactivation is performed by network.

In one example, the scheduling request sent from the UE requests the deactivation of the semi-persistent PUCCH for UE initiated reporting. The network further transmits a signal to deactivate the semi-persistent PUCCH. The signal from the network can be transmitted by MAC CE and/or DCI.

In one example, if a UE does not transmit a report on instance of an activated semi-persistent PUCCH for a time T, the network can deactivate the semi-persistent PUCCH. Wherein, T can be specified in system specification (e.g., in one example T=0) and/or configured and/or updated by RRC signaling and/or MAC CE signaling and/or L1 control (e.g., DCI) signaling.

In one example, the UL resource for UE initiated report (e.g., step 3 message of FIG. 17) is aperiodic PUCCH. In one example, multiple aperiodic PUCCH report configurations are configured, wherein a UE can select an aperiodic PUCCH configuration based on the report payload size and/or the report type.

In one example, the network configures the aperiodic PUCCH resources by higher layer signaling (e.g., RRC signaling).

In one example, the network configures the aperiodic PUCCH resources by higher layer signaling (e.g., RRC signaling). The UE can transmit a signal in the uplink to adapt (or request the adaptation of) the number of PUCCH resources instances to be triggered (if not 1 instance) or adapted (or request the adaptation of) the allocated resources per instance of PUCCH). In one example, the signal to adapt the periodicity of PUCCH resources is a PUCCH transmission. In one example, the signal to adapt the periodicity of PUCCH resources is a PUSCH transmission. In one example, the signal to adapt the periodicity of PUCCH resources is a PRACH transmission.

In one example, the network configures the aperiodic PUCCH resources by higher layer signaling (e.g., RRC signaling). The UE can transmit a signal in the uplink to trigger the aperiodic PUCCH. In one example, the signal to activate the PUCCH is a PUCCH transmission. In one example, the signal to activate the PUCCH is a PUSCH transmission. In one example, the signal to activate the PUCCH is a PRACH transmission. In one example, multiple trigger or activation signals associated with different report configurations or report payload size are configured, the UE can select an activation signal based on the payload size or configuration of the report.

In one example, the network configures the aperiodic PUCCH resources by higher layer signaling (e.g., RRC signaling). The UE can transmit a signal in the uplink to trigger the network triggering of the aperiodic PUCCH. The network transmits a signal to the UE to activate the aperiodic PUCCH. In one example, the signal to trigger the activation of the PUCCH is a PUCCH transmission. In one example, the signal to trigger the activation of the PUCCH is a PUSCH transmission. In one example, the signal to trigger the activation of the PUCCH is a PRACH transmission. In one example, multiple trigger signals associated with different report configurations or report payload size are configured, the UE can select an activation signal based on the payload size or configuration of the report In one example, the report from the UE is included in UCI transmitted in an aperiodic PUCCH.

In one example, the report from the UE is single part (single stage) transmission transmitted in an aperiodic PUCCH.

In one example, the report from the UE is a two-part (two stage) transmission transmitted in an aperiodic PUCCH.

In one example, the first part (first stage) of a report from the UE is included in a first UCI, and the second part (second stage) of a report from the UE is included in a second UCI. In one example, both the first UCI and the second UCI are included in the same transmission instance of aperiodic PUCCH. In one example, the first UCI is included in a first instance of an aperiodic PUCCH, and the second UCI is included in a second instance of an aperiodic PUCCH. In one example, first UCI is included in an UL transmission (e.g., other than an aperiodic PUCCH), and the second UCI is included in an aperiodic PUCCH. In one example, the first UCI is included in an aperiodic PUCCH, and the second UCI is included in an UL transmission (e.g., other than an aperiodic PUCCH).

In one example, a same aperiodic PUCCH transmission instance (or configuration) is used for multiple report types (e.g., beam report, mobility report, CSI report, TDCP report, time related report, other report). In one example, the report types have a same payload size (e.g., after padding). In one example, the report types can have different payload size.

In one example, a same aperiodic PUCCH transmission instance (or configuration) is used for multiple report types (e.g., beam report, mobility report, CSI report, TDCP report, time related report, other report). A first stage (or first part) can signal the report type and/or payload size and/or configuration of report.

In one example, a same aperiodic PUCCH transmission instance (or configuration) is used for multiple report types (e.g., beam report, mobility report, CSI report, TDCP report, time related report, other report). A pre-notification message sent before a transmission instance of an aperiodic PUCCH can indicate the report type and/or payload size and/or configuration of report. In one example, multiple pre-notification configurations are configured, wherein a UE can select a pre-notification configuration based on the report payload size and/or the report type.

In one example, different aperiodic PUCCH transmission instances (or configurations) are used for different report types (e.g., beam report, mobility report, CSI report, TDCP report, time related report, other report) and/or payload size. e.g., each report type has an associated aperiodic configuration. In one example, a pre-notification can indicate a Type 1 CG-PUSCH configuration. In one example, an aperiodic PUCCH configuration is selected based on the payload size of the report.

In one example, a different aperiodic PUCCH transmission instances are used for different report types (e.g., beam report, mobility report, CSI report, TDCP report, time related report, other report). e.g., each report type has an associated aperiodic PUCCH transmission instance. A pre-notification message or scheduling request sent before a transmission instance of an aperiodic PUCCH can indicate the report type and/or payload size and/or configuration of report. In one example, a pre-notification can indicate an aperiodic PUCCH configuration. In one example, an aperiodic PUCCH configuration is selected based on the payload size of the report.

In one example, an aperiodic PUCCH transmission instance can multiplex one or more report types (e.g., beam report, mobility report, CSI report, TDCP report, time related report, other report) with no other UL control information.

In one example, an aperiodic PUCCH transmission instance can multiplex one or more report types (e.g., beam report, mobility report, CSI report, TDCP report, time related report, other report) with no other UL control information. In one example, the report types which can be multiplexed or transmitted in a same transmission instance have a same priority. In one example, the report types which can be multiplexed or transmitted in a same transmission instance have a same payload size.

In one example, an aperiodic PUCCH transmission instance can multiplex one or more report types (e.g., beam report, mobility report, CSI report, TDCP report, time related report, other report) with no other UL control information. In one example, the report types which can be multiplexed or transmitted in a same transmission instance can have different priorities. In one example, the report types which can be multiplexed or transmitted in a same transmission instance can have different payload sizes.

In one example, a periodic PUCCH transmission instance can multiplex one or more report types (e.g., beam report, mobility report, CSI report, TDCP report, time related report, other report) with other UL control information.

In one example, an aperiodic PUCCH transmission instance can multiplex one or more report types (e.g., beam report, mobility report, CSI report, TDCP report, time related report, other report) with other UL control information. In one example, the report types which can be multiplexed or transmitted in a same transmission instance have a same priority. In one example, the report types which can be multiplexed or transmitted in a same transmission instance have a same payload size.

In one example, an aperiodic PUCCH transmission instance can multiplex one or more report types (e.g., beam report, mobility report, CSI report, TDCP report, time related report, other report) with other UL control information. In one example, the report types which can be multiplexed or transmitted in a same transmission instance can have different priorities. In one example, the report types which can be multiplexed or transmitted in a same transmission instance can have different payload sizes.

In one example, an aperiodic PUCCH transmission instance carrying a UE initiated reported can be preceded by a pre-notification signal/channel. The pre-notification signal/channel is to alert/inform the gNB/TRP/network of an upcoming aperiodic PUCCH transmission instance. In one example, multiple pre-notification configurations are configured, wherein a UE can select a pre-notification configuration based on the report payload size and/or the report type.

In one example, an aperiodic PUCCH transmission instance carrying a UE initiated reported can be preceded by a pre-notification signal/channel. In one example, the pre-notification signal/channel can indicate the report type or types (e.g., beam report, mobility report, CSI report, TDCP report, time related report, other report) and/or payload size and/or aperiodic PUCCH configuration in the associated aperiodic PUCCH transmission instance. In one example, multiple pre-notification signals associated with different report configurations or report payload size are configured, the UE can select a pre-notification signal based on the payload size or configuration of the report.

In one example, an aperiodic transmission instance carrying a UE initiated reported can be preceded by a pre-notification signal/channel. The pre-notification signal/channel is to alert/inform the gNB/TRP/network of an upcoming aperiodic PUCCH transmission instance. In one example, the pre-notification signal/channel can be for N aperiodic PUCCH transmission instances. Wherein, N can be specified in specifications and/or configured or updated by higher layer signaling (e.g., RRC signaling and/or MAC CE signaling) and/or configured by L1 control signaling (e.g., DCI signaling) and/or included or signaled in the pre-notification message. The N aperiodic PUCCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the pre-notification message.

In one example, a UE can transmit a scheduling request to the network to trigger aperiodic PUCCH for UE initiated reporting. In one example the aperiodic PUCCH only includes one or more UE initiated reports, with no other UL control information. In one example the aperiodic PUCCH includes one or more UE initiated reports and can include other UL control information. In one example, multiple scheduling requests associated with different report configurations or report payload size are configured, the UE can select a scheduling request based on the payload size or configuration of the report.

In one example, a UE can transmit a scheduling request to the network to activate aperiodic PUCCH for UE initiated reporting. A scheduling request can be common for all report types (e.g., beam report, mobility report, CSI report, TDCP report, time related report, other report).

In one example, a UE can transmit a scheduling request to the network to trigger aperiodic PUCCH for UE initiated reporting. A scheduling request can apply to more than one report type (e.g., beam report, mobility report, CSI report, TDCP report, time related report, other report). In one example, the report types to which the scheduling request applies have a same priority. In one example, the report types to which the scheduling request applies can have different priorities. In one example, the report types to which the scheduling request applies have a same payload size. In one example, the report types to which the scheduling request applies can have different payload sizes.

In one example, a UE can transmit a scheduling request to the network to trigger aperiodic PUCCH for UE initiated reporting. A scheduling can apply to one report type.

In one example, the scheduling request sent from the UE triggers the aperiodic PUCCH for UE initiated reporting. No further activation is performed by network.

In one example, the scheduling request sent from the UE requests the triggering by the network of the aperiodic PUCCH for UE initiated reporting. The network further transmits a signal to trigger the aperiodic PUCCH. The signal from the network can be transmitted by DCI and/or MAC CE.

In one example, a UE can transmit a scheduling request to the network for the network to trigger an aperiodic PUCCH for UE initiated reporting. In one example, the scheduling request can be for N aperiodic PUCCH transmission instances. Wherein, N can be specified in specifications and/or configured or updated by higher layer signaling (e.g., RRC signaling and/or MAC CE signaling) and/or configured by L1 control signaling (e.g., DCI signaling) and/or included or signaled in the scheduling request. The N aperiodic PUCCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the scheduling request.

In one example, a UE can transmit a scheduling request to the network for the network to trigger an aperiodic PUCCH for UE initiated reporting. In response the network sends a triggering request for aperiodic PUCCH to the UE. In one example, the triggering request can be for N aperiodic PUCCH transmission instances. Wherein, N can be specified in specifications and/or configured or updated by higher layer signaling (e.g., RRC signaling and/or MAC CE signaling) and/or configured by L1 control signaling (e.g., DCI signaling) and/or included or signaled in the scheduling grant. The N aperiodic transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the scheduling grant.

In one example, the network can transmit a trigger request for aperiodic PUCCH to UE to transmit a report. In one example, multiple trigger requests associated with different report configurations or report payload size are configured, the network can select a trigger request based on the payload size or configuration of the report.

In one example, the network can transmit a trigger request for aperiodic PUCCH to UE to transmit a report. In one example, the trigger request for aperiodic PUCCH is for a report that only includes one or more UE initiated reports, with no other UL control information.

In one example, the network can transmit a trigger request for aperiodic PUCCH to UE to transmit a report. In one example, the trigger request for aperiodic PUCCH is for a report that includes one or more UE initiated reports, with other UL control information.

In one example, the network can transmit a trigger request for aperiodic PUCCH to UE. In one example, the trigger request for aperiodic PUCCH is for UL control information, and the UE can use the scheduling grant to transmit one or more UE initiated reports.

In one example, the network can transmit a trigger request for aperiodic PUCCH to UE to transmit a report. In one example, the trigger request for aperiodic PUCCH can be for N aperiodic PUCCH transmission instances. Wherein, N can be specified in specifications and/or configured or updated by higher layer signaling (e.g., RRC signaling and/or MAC CE signaling) and/or configured by L1 control signaling (e.g., DCI signaling) and/or included or signaled in the scheduling grant. The N aperiodic PUCCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the scheduling grant.

In one example, the UL resource for UE initiated report (e.g., step 3 message of FIG. 17) is associated with Type 1 random access procedure. In one example, multiple Type 1 random access report configurations are configured, wherein a UE can select a Type 1 random access configuration based on the report payload size and/or the report type.

In one example, the Type 1 random access procedure is CBRA procedure.

In one example, the Type 1 random access procedure is contention free random access (CFRA) procedure.

In one example, the Type 1 random access procedure is triggered by a PDCCH order.

In one example, the Type 1 random access procedure is triggered by higher layers. In one example, the Type 1 random access procedure is triggered by the higher layers of the UE (e.g., UE initiated). In one example, the Type 1 random access procedure is triggered by the higher layers of the network (e.g., network initiated).

In one example, the UL resource for UE initiated report (e.g., step 3 message of FIG. 17) is associated with Type 1 random access procedure. The UE initiated report is included in Msg3 of the Type 1 random access procedure.

In one example, the report from the UE is included in a MAC-CE transmitted in the PUSCH of Msg3.

In one example, the report from the UE is included in UCI transmitted in the PUSCH of Msg3.

In one example, the UL resource for UE initiated report (e.g., step 3 message of FIG. 17) is associated with Type 1 random access procedure. The UE initiated report is included in a PUCSH transmission scheduled the grant included in the random access response (RAR) (RAR UL grant).

In one example, the report from the UE is included in a MAC-CE transmitted in the PUSCH scheduled by the grant included in the RAR (RAR UL grant).

In one example, the report from the UE is included in UCI transmitted in the PUSCH scheduled by the grant included in the RAR (RAR UL grant).

In one example, the report from the UE is single part (single stage) transmission transmitted in PUSCH of Msg3 or PUSCH scheduled by the grant included in the RAR (RAR UL grant).

In one example, the report from the UE is a two-part (two stage) transmission transmitted in PUSCH of Msg3 or PUSCH scheduled by the grant included in the RAR (RAR UL grant).

In one example, the first part (first stage) of a report from the UE is included in a first UCI, and the second part (second stage) of a report from the UE is included in a second UCI. In one example, both the first UCI and the second UCI are included in the same transmission instance of PUSCH of Msg3 or PUSCH scheduled by the grant included in the RAR (RAR UL grant). In one example, the first UCI is included in a first instance of a PUSCH of Msg3 or a PUSCH scheduled by the grant included in the RAR (RAR UL grant), and the second UCI is included in a second instance of a PUSCH of Msg3 or a PUSCH scheduled by the grant included in the RAR (RAR UL grant). In one example, first UCI is included in an UL transmission (e.g., other than PUSCH of Msg3 or PUSCH scheduled by the grant included in the RAR (RAR UL grant)), and the second UCI is included in a PUSCH of Msg3 or a PUSCH scheduled by the grant included in the RAR (RAR UL grant). In one example, the first UCI is included in a PUSCH of Msg3 or a PUSCH scheduled by the grant included in the RAR (RAR UL grant), and the second UCI is included in an UL transmission (e.g., other than PUSCH of Msg3 or PUSCH scheduled by the grant included in the RAR (RAR UL grant)).

In one example, the first part (first stage) of a report from the UE is included in a first MAC CE, and the second part (second stage) of a report from the UE is included in a second MAC CE. In one example, both the first MAC CE and the second MAC CE are included in the same transmission instance of PUSCH of Msg3 or PUSCH scheduled by the grant included in the RAR (RAR UL grant). In one example, the first MAC CE is included in a first instance of a PUSCH of Msg3 or a PUSCH scheduled by the grant included in the RAR (RAR UL grant), and the second MAC CE is included in a second instance of a PUSCH of Msg3 or a PUSCH scheduled by the grant included in the RAR (RAR UL grant). In one example, first MAC CE is included in an UL transmission (e.g., other than PUSCH of Msg3 or PUSCH scheduled by the grant included in the RAR (RAR UL grant)), and the second MAC CE is included in a PUSCH of Msg3 or a PUSCH scheduled by the grant included in the RAR (RAR UL grant). In one example, the first MAC CE is included in a PUSCH of Msg3 or a PUSCH scheduled by the grant included in the RAR (RAR UL grant), and the second MAC CE is included in an UL transmission (e.g., other than PUSCH of Msg3 or PUSCH scheduled by the grant included in the RAR (RAR UL grant)).

In one example, the first part (first stage) of a report from the UE is included in a UCI, and the second part (second stage) of a report from the UE is included in a MAC CE. In one example, both the UCI and the MAC CE are included in the same transmission instance of PUSCH of Msg3 or PUSCH scheduled by the grant included in the RAR (RAR UL grant). In one example, the UCI is included in a first instance of a PUSCH of Msg3 or a PUSCH scheduled by the grant included in the RAR (RAR UL grant), and the MAC CE is included in a second instance of a PUSCH of Msg3 or a PUSCH scheduled by the grant included in the RAR (RAR UL grant). In one example, UCI is included in an UL transmission (e.g., other than PUSCH of Msg3 or PUSCH scheduled by the grant included in the RAR (RAR UL grant)), and the MAC CE is included in a PUSCH of Msg3 or a PUSCH scheduled by the grant included in the RAR (RAR UL grant). In one example, the UCI is included in a PUSCH of Msg3 or a PUSCH scheduled by the grant included in the RAR (RAR UL grant), and the MAC CE is included in an UL transmission (e.g., other than PUSCH of Msg3 or PUSCH scheduled by the grant included in the RAR (RAR UL grant)).

In one example, the first part (first stage) of a report from the UE is included in a MAC CE, and the second part (second stage) of a report from the UE is included in a UCI. In one example, both the MAC CE and the UCI are included in the same transmission instance of PUSCH of Msg3 or PUSCH scheduled by the grant included in the RAR (RAR UL grant). In one example, the MAC CE is included in a first instance of a PUSCH of Msg3 or a PUSCH scheduled by the grant included in the RAR (RAR UL grant), and the UCI is included in a second instance of a PUSCH of Msg3 or a PUSCH scheduled by the grant included in the RAR (RAR UL grant). In one example, MAC CE is included in an UL transmission (e.g., other than PUSCH of Msg3 or PUSCH scheduled by the grant included in the RAR (RAR UL grant)), and the UCI is included in a PUSCH of Msg3 or a PUSCH scheduled by the grant included in the RAR (RAR UL grant). In one example, the MAC CE is included in a PUSCH of Msg3 or a PUSCH scheduled by the grant included in the RAR (RAR UL grant), and the UCI is included in an UL transmission (e.g., other than PUSCH of Msg3 or PUSCH scheduled by the grant included in the RAR (RAR UL grant)).

In one example, a same Type 1 random access procedure transmission instance (or configuration) is used for multiple report types (e.g., beam report, mobility report, CSI report, TDCP report, time related report, other report). In one example, the report types have a same payload size (e.g., after padding). In one example, the report types can have different payload size.

In one example, a same Type 1 random access procedure transmission instance (or configuration) is used for multiple report types (e.g., beam report, mobility report, CSI report, TDCP report, time related report, other report). A first stage (or first part) can signal the report type and/or payload size and/or configuration of report.

In one example, a same Type 1 random access procedure transmission instance (or configuration) is used for multiple report types (e.g., beam report, mobility report, CSI report, TDCP report, time related report, other report). A pre-notification message sent can indicate the report type and/or payload size and/or configuration of report. The pre-notification message can be the preamble of the Type 1 random access procedure, wherein the preamble index of the preamble and/or the PRACH Occasion (RO) of the preamble can indicate the report type and/or payload size and/or configuration of report.

In one example, different Type 1 random access procedure transmission instances (or configurations) are used for different report types (e.g., beam report, mobility report, CSI report, TDCP report, time related report, other report) and/or payload size. e.g., each report type has an associated Type 1 random access procedure transmission instance (or configuration). In one example, a preamble or a group of preambles or RACH Occasion are associated (e.g., by configuration) with a report type and/or payload and/or PUSCH configuration.

In one example, a transmission instance of PUSCH of Msg3 or PUSCH scheduled by the grant included in the RAR (RAR UL grant) can multiplex one or more report types (e.g., beam report, mobility report, CSI report, TDCP report, time related report, other report) with no other UL data transmission.

In one example, a transmission instance of PUSCH of Msg3 or PUSCH scheduled by the grant included in the RAR (RAR UL grant) can multiplex one or more report types (e.g., beam report, mobility report, CSI report, TDCP report, time related report, other report) with no other UL data transmission. In one example, the report types which can be multiplexed or transmitted in a same transmission instance have a same priority. In one example, the report types which can be multiplexed or transmitted in a same transmission instance have a same payload size.

In one example, a transmission instance of PUSCH of Msg3 or PUSCH scheduled by the grant included in the RAR (RAR UL grant) can multiplex one or more report types (e.g., beam report, mobility report, CSI report, TDCP report, time related report, other report) with no other UL data transmission. In one example, the report types which can be multiplexed or transmitted in a same transmission instance can have different priorities. In one example, the report types which can be multiplexed or transmitted in a same transmission instance can have different payload sizes.

In one example, a transmission instance of PUSCH of Msg3 or PUSCH scheduled by the grant included in the RAR (RAR UL grant) can multiplex one or more report types (e.g., beam report, mobility report, CSI report, TDCP report, time related report, other report) with other UL data transmission.

In one example, a transmission instance of PUSCH of Msg3 or PUSCH scheduled by the grant included in the RAR (RAR UL grant) can multiplex one or more report types (e.g., beam report, mobility report, CSI report, TDCP report, time related report, other report) with other UL data transmission. In one example, the report types which can be multiplexed or transmitted in a same transmission instance have a same priority. In one example, the report types which can be multiplexed or transmitted in a same transmission instance have a same payload size.

In one example, a transmission instance of PUSCH of Msg3 or PUSCH scheduled by the grant included in the RAR (RAR UL grant) can multiplex one or more report types (e.g., beam report, mobility report, CSI report, TDCP report, time related report, other report) with other UL data transmission. In one example, the report types which can be multiplexed or transmitted in a same transmission instance can have different priorities. In one example, the report types which can be multiplexed or transmitted in a same transmission instance can have different payload sizes.

In one example, the UL resource for UE initiated report (e.g., step 3 message of FIG. 17) is associated with Type 2 random access procedure. In one example, multiple Type 2 random access report configurations are configured, wherein a UE can select a Type 2 random access configuration based on the report payload size and/or the report type.

In one example, the Type 2 random access procedure is CBRA procedure.

In one example, the Type 2 random access procedure is contention free random access (CFRA) procedure.

In one example, the Type 2 random access procedure is triggered by a PDCCH order.

In one example, the Type 2 random access procedure is triggered by higher layers. In one example, the Type 2 random access procedure is triggered by the higher layers of the UE (e.g., UE initiated). In one example, the Type 2 random access procedure is triggered by the higher layers of the network (e.g., network initiated).

In one example, the UL resource for UE initiated report (e.g., step 3 message of FIG. 17) is associated with Type 2 random access procedure. The UE initiated report is included in the PUSCH of MsgA.

In one example, the report from the UE is included in a MAC-CE transmitted in the PUSCH of MsgA.

In one example, the report from the UE is included in UCI transmitted in the PUSCH of MsgA.

In one example, the report from the UE is single part (single stage) transmission transmitted in PUSCH of MsgA.

In one example, the report from the UE is a two-part (two stage) transmission transmitted in PUSCH of MsgA.

In one example, the first part (first stage) of a report from the UE is included in a first UCI, and the second part (second stage) of a report from the UE is included in a second UCI. In one example, both the first UCI and the second UCI are included in the same transmission instance of PUSCH of MsgA. In one example, the first UCI is included in a first instance of a PUSCH of MsgA, and the second UCI is included in a second instance of a PUSCH of MsgA. In one example, first UCI is included in an UL transmission (e.g., other than PUSCH of MsgA), and the second UCI is included in a PUSCH of MsgA. In one example, the first UCI is included in a PUSCH of MsgA, and the second UCI is included in an UL transmission (e.g., other than PUSCH of MsgA).

In one example, the first part (first stage) of a report from the UE is included in a first MAC CE, and the second part (second stage) of a report from the UE is included in a second MAC CE. In one example, both the first MAC CE and the second MAC CE are included in the same transmission instance of PUSCH of MsgA. In one example, the first MAC CE is included in a first instance of a PUSCH of MsgA, and the second MAC CE is included in a second instance of a PUSCH of MsgA. In one example, first MAC CE is included in an UL transmission (e.g., other than PUSCH of MsgA), and the second MAC CE is included in a PUSCH of MsgA. In one example, the first MAC CE is included in a PUSCH of MsgA, and the second MAC CE is included in an UL transmission (e.g., other than PUSCH of MsgA).

In one example, the first part (first stage) of a report from the UE is included in a UCI, and the second part (second stage) of a report from the UE is included in a MAC CE. In one example, both the UCI and the MAC CE are included in the same transmission instance of PUSCH of MsgA. In one example, the UCI is included in a first instance of a PUSCH of MsgA, and the MAC CE is included in a second instance of a PUSCH of MsgA. In one example, UCI is included in an UL transmission (e.g., other than PUSCH of MsgA), and the MAC CE is included in a PUSCH of MsgA. In one example, the UCI is included in a PUSCH of MsgA, and the MAC CE is included in an UL transmission (e.g., other than PUSCH of MsgA).

In one example, the first part (first stage) of a report from the UE is included in a MAC CE, and the second part (second stage) of a report from the UE is included in a UCI. In one example, both the MAC CE and the UCI are included in the same transmission instance of PUSCH of MsgA. In one example, the MAC CE is included in a first instance of a PUSCH of MsgA, and the UCI is included in a second instance of a PUSCH of MsgA. In one example, MAC CE is included in an UL transmission (e.g., other than PUSCH of MsgA), and the UCI is included in a PUSCH of MsgA. In one example, the MAC CE is included in a PUSCH of MsgA, and the UCI is included in an UL transmission (e.g., other than PUSCH of MsgA).

In one example, a same Type 2 random access procedure transmission instance (or configuration) is used for multiple report types (e.g., beam report, mobility report, CSI report, TDCP report, time related report, other report). In one example, the report types have a same payload size (e.g., after padding). In one example, the report types can have different payload size.

In one example, a same Type 2 random access procedure transmission instance (or configuration) is used for multiple report types (e.g., beam report, mobility report, CSI report, TDCP report, time related report, other report). A first stage (or first part) can signal the report type and/or payload size and/or configuration or report.

In one example, a same Type 2 random access procedure transmission instance (or configuration) is used for multiple report types (e.g., beam report, mobility report, CSI report, TDCP report, time related report, other report). A pre-notification message sent can indicate the report type and/or payload size and/or configuration of report. The pre-notification message can be the preamble of the Type 2 random access procedure, wherein the preamble index of the preamble and/or the PRACH occasion (RO) of the preamble can indicate the report type and/or payload size and/or configuration of report. In other example, the PUSCH Occasion of MsgA PUSCH can indicate the report type and/or payload size and/or configuration of report.

In one example, different Type 2 random access procedure transmission instances (or configurations) are used for different report types (e.g., beam report, mobility report, CSI report, TDCP report, time related report, other report) and/or payload size. e.g., each report type has an associated Type 2 random access procedure transmission instance (or configuration). In one example, a preamble or a group of preambles or RACH Occasion or MsgA PUSCH Occasion are associated (e.g., by configuration) with a report type and/or payload and/or PUSCH configuration.

In one example, a transmission instance of PUSCH of MsgA can multiplex one or more report types (e.g., beam report, mobility report, CSI report, TDCP report, time related report, other report) with no other UL data transmission.

In one example, a transmission instance of PUSCH of MsgA can multiplex one or more report types (e.g., beam report, mobility report, CSI report, TDCP report, time related report, other report) with no other UL data transmission. In one example, the report types which can be multiplexed or transmitted in a same transmission instance have a same priority. In one example, the report types which can be multiplexed or transmitted in a same transmission instance have a same payload size.

In one example, a transmission instance of PUSCH of MsgA can multiplex one or more report types (e.g., beam report, mobility report, CSI report, TDCP report, time related report, other report) with no other UL data transmission. In one example, the report types which can be multiplexed or transmitted in a same transmission instance can have different priorities. In one example, the report types which can be multiplexed or transmitted in a same transmission instance can have different payload sizes.

In one example, a transmission instance of PUSCH of MsgA can multiplex one or more report types (e.g., beam report, mobility report, CSI report, TDCP report, time related report, other report) with other UL data transmission.

In one example, a transmission instance of PUSCH of MsgA can multiplex one or more report types (e.g., beam report, mobility report, CSI report, TDCP report, time related report, other report) with other UL data transmission. In one example, the report types which can be multiplexed or transmitted in a same transmission instance have a same priority. In one example, the report types which can be multiplexed or transmitted in a same transmission instance have a same payload size.

In one example, a transmission instance of PUSCH of MsgA can multiplex one or more report types (e.g., beam report, mobility report, CSI report, TDCP report, time related report, other report) with other UL data transmission. In one example, the report types which can be multiplexed or transmitted in a same transmission instance can have different priorities. In one example, the report types which can be multiplexed or transmitted in a same transmission instance can have different payload sizes.

In one example, a UE can send a request to the network for UL transmission resources to provide a report to the network. The network can respond by allocating resources for UL transmission. In one example, multiple requests associated with different report configurations or report payload size are configured, the UE can select a request based on the payload size or configuration of the report In one example, a UE can send a request to the network for UL transmission resources to provide a report to the network. The network sends a scheduling grant allocating DG-PUSCH.

In one example, a UE can send a request to the network for UL transmission resources to provide a report to the network. The network sends a scheduling grant allocating N transmission instances of DG-PUSCH. Wherein, N can be specified in specifications and/or configured or updated by higher layer signaling (e.g., RRC signaling and/or MAC CE signaling) and/or configured by L1 control signaling (e.g., DCI signaling) and/or included or signaled in the pre-notification message. In one example, the N DG-PUSCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the pre-notification message. In another example, the scheduling grant includes resources for the N DG-PUSCH transmission instances.

In one example, a UE can send a request to the network for UL transmission resources to provide a report to the network. The network activates a Type 2 CG-PUSCH.

In one example, a UE can send a request to the network for UL transmission resources to provide a report to the network. The network sends a grant allocating aperiodic PUCCH.

In one example, a UE can send a request to the network for UL transmission resources to provide a report to the network. The network sends a grant allocating N transmission instances of aperiodic PUCCH. Wherein, N can be specified in specifications and/or configured or updated by higher layer signaling (e.g., RRC signaling and/or MAC CE signaling) and/or configured by L1 control signaling (e.g., DCI signaling) and/or included or signaled in the pre-notification message. In one example, the N aperiodic PUCCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the pre-notification message. In another example, the grant includes resources for the N aperiodic PUCCH transmission instances.

In one example, a UE can send a request to the network for UL transmission resources to provide a report to the network. The network activates a semi-persistent PUCCH.

In one example, a UE can send a request to the network for UL transmission resources to provide a report to the network. The network sends a PDCCH order for RACH transmission. In one example, the PDCCH order can be for CBRA. In another example, the PDCCH order can be for CFRA.

In one example, the scheduling grant or grant is included in L1 control signaling (e.g., DCI).

In one example, the scheduling grant or grant is included in MAC CE signaling.

In one example, the scheduling grant or grant is included in RRC signaling.

In one example, a UE can send a pre-notification signal/channel to the network for an upcoming UL transmission to provide a report to the network. In one example, multiple pre-notification signals/channels associated with different report configurations or report payload size are configured, the UE can select a pre-notification signal/channel based on the payload size or configuration of the report In one example, a UE can send a pre-notification signal/channel to the network for an upcoming UL transmission to provide a report to the network. The UE sends the report in DG-PUSCH.

In one example, a UE can send a pre-notification signal/channel to the network for an upcoming UL transmission to provide a report to the network. The UE sends N transmission instances of DG-PUSCH including UE initiated reporting. Wherein, N can be specified in specifications and/or configured or updated by higher layer signaling (e.g., RRC signaling and/or MAC CE signaling) and/or configured by L1 control signaling (e.g., DCI signaling) and/or included or signaled in the pre-notification message. In one example, the N DG-PUSCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the pre-notification message. In another example, the pre-notification signal/channel includes resources for the N DG-PUSCH transmission instances. In one example, the N transmission instances include the same data (repetition). In another example, the N transmission instances can include different data. In another example, some of the N instances include the same (repetition across a subset of the N transmission instances).

In one example, a UE can send a pre-notification signal/channel to the network for an upcoming UL transmission to provide a report to the network. The pre-notification signal/channel activates a Type 2 CG-PUSCH.

In one example, a UE can send a pre-notification signal/channel to the network for an upcoming UL transmission to provide a report to the network. The UE sends the report in aperiodic PUCCH.

In one example, a UE can send a pre-notification signal/channel to the network for an upcoming UL transmission to provide a report to the network. The UE sends N transmission instances of aperiodic PUCCH including UE initiated reporting. Wherein, N can be specified in specifications and/or configured or updated by higher layer signaling (e.g., RRC signaling and/or MAC CE signaling) and/or configured by L1 control signaling (e.g., DCI signaling) and/or included or signaled in the pre-notification message. In one example, the N aperiodic PUCCH transmission instances can be sent periodically with a period T, wherein T can be specified in specifications and/or configured or updated by higher layer signaling (e.g., RRC signaling and/or MAC CE signaling) and/or configured by L1 control signaling (e.g., DCI signaling) and/or included or signaled in the pre-notification message. In another example, the pre-notification signal/channel includes resources for the N aperiodic PUCCH transmission instances. In one example, the N transmission instances include the same data (repetition). In another example, the N transmission instances can include different data. In another example, some of the N instances include the same (repetition across a subset of the N transmission instances).

In one example, a UE can send a pre-notification signal/channel to the network for an upcoming UL transmission to provide a report to the network The pre-notification signal/channel activates a semi-persistent PUCCH.

In one example, a UE can send a pre-notification signal/channel to the network for an upcoming UL transmission to provide a report to the network. The pre-notification signal/channel triggers a RACH transmission based on PDCCH order. In one example, the PDCCH order can be for CBRA. In another example, the PDCCH order can be for CFRA.

In one example, a UE can send a request to the network for UL transmission resources to provide a report to the network, or a UE can send a pre-notification signal/channel to the network for an upcoming UL transmission to provide a report to the network. The report can be for at least one of: (1) a report for beam measurements (e.g., including L1-RSRP and/or L1-SINR and/or beam indicator (e.g., TCI state)). The aforementioned examples in step 2 of FIG. 9 can apply here; (2) a report for mobility (or handover) measurements (e.g., including L1-RSRP and/or L3-RSRP and/or L1-SINR and/or RSRQ and/or beam indicator (e.g., TCI state) and/or cell indicator). The aforementioned examples in step 2 of FIG. 9 can apply here; (3) a report for CSI related measurements (e.g., including CSI and/or PMI and/or RI and/or L1 and/or CRI); (4) a report for TDCP related measurements (e.g., including TDCP-related quantity/quantities and/or indicator(s) for Doppler profile and/or indicator(s) for auto-correlation profile); (5) a report for time related measurements (e.g., including time of arrival difference of RS from different transmission points); and (6) a report for Other non-beam, non-mobility, non-CSI, non-TDCP, non-time related measurements.

In one example, a same resource or resource setting for request or pre-notification is used for all event types.

In one example, a different resource or resource setting for request or pre-notification is used for each event type and/or based on the payload size of the report.

In one example, a same resource or resource setting for request or pre-notification is used for some event types, e.g., reports with a same payload size and/or same priority can have a same resource or resource setting.

In one example, a same resource or resource setting for request or pre-notification is used for some event types. The events associated with a resource or resource setting for request or pre-notification are configured by RRC signaling and/or by MAC CE signaling and/or by L1 control (e.g., DCI) signaling.

In one example, a same resource or resource setting for request or pre-notification is used for some event types. The events associated with a resource or resource setting have a report with a same priority.

In one example, a same resource or resource setting for request or pre-notification is used for some event types. The events associated with a resource or resource setting have a report with a same payload size.

In one example, a container for the request or pre-notification is provided.

In one example, the container is PUCCH format 0 or PUCCH format 1 (carrying 1 or 2 bits of information), in which case the container can provide just a trigger for a network action or an alert/notification of an upcoming UL transmission. In one example, the payload of the request or pre-notification can indicate the configuration to use for the report.

In one example, the container is PUCCH format 2 or PUCCH format 3 or PUCCH format 4 (carrying more than 2 bits of information), in which case the container can provide additional information besides the trigger or alter/notification. For example, the request or pre-notification can indicate the number of transmission instances. In one example, the payload of the request or pre-notification can indicate the configuration to use for the report In the following a TCI state, UL TCI state or Joint TCI state can be replaced by spatial relation information.

In one example, a single TRP is provided.

In one example, a single TRP is provided. The UE uses the most recently indicated UL TCI state or joint TCI state for the transmission of the request or pre-notification.

In one example, a single TRP is provided. The UE uses the most recently indicated UL TCI state or joint TCI state for the UL transmission containing the UE initiated report.

In one example, a single TRP is provided. A UE is configured a set of TCI states associated with each TCI state. Based on the indicated TCI state, the UE can select one of the TCI states associated with the indicated TCI state. The selected TCI state is used for the transmission of the request or pre-notification.

In one example, a single TRP is provided. A UE is configured a set of TCI states associated with each TCI state. Based on the indicated TCI state, the UE can select one of the TCI states associated with the indicated TCI state. The selected TCI state is used for the UL transmission containing the UE initiated report. In one example, the selected TCI state is indicated in the pre-notification or the request.

In one example, a single TRP is provided. A same TCI state is used for the transmission of the request or pre-notification and for the UL transmission containing the UE initiated report.

In one example, a single TRP is provided. Different TCI states are used for the transmission of the request or pre-notification and for the UL transmission containing the UE initiated report. In one example, the TCI state for the UL transmission containing the UE initiated report can be indicated in the request or pre-notification.

In one example, a single TRP is provided. A UE is configured a set of TCI states associated with each TCI state. Based on the indicated TCI state, the UE can select one or more of the TCI states associated with the indicated TCI state including the indicated TCI state. The selected TCI states are used for the transmission of the request or pre-notification.

In one example, a single TRP is provided. A UE is configured a set of TCI states associated with each TCI state. Based on the indicated TCI state, the UE can select one or more of the TCI states associated with the indicated TCI state including the indicated TCI state. The selected TCI states are used for the UL transmission containing the UE initiated report. In one example, the selected TCI states are indicated in the pre-notification or the request.

In one example, multiple TRPs (e.g., a TRP can be associated with a coresetPoolIndex, or a TRP can be associated with a group of SS/PBCH Blocks) belonging to a same cell (intra-cell) are provided.

In one example, multiple TRPs belonging to a same cell (intra-cell) are provided. The UE selects a TRP. The UE uses the most recently indicated UL TCI state or joint TCI state for the selected TRP for the transmission of the request or pre-notification.

In one example, multiple TRPs belonging to a same cell (intra-cell) are provided. The UE selects a TRP. The UE uses the most recently indicated UL TCI state or joint TCI state for the selected TRP for the UL transmission containing the UE initiated report.

In one example, multiple TRPs belonging to a same cell (intra-cell) are provided. The network configures or dynamically indicates a TRP to which UE initiated reports are transmitted. The UE uses the most recently indicated UL TCI state or joint TCI state for the configured or indicated TRP for the transmission of the request or pre-notification.

In one example, multiple TRPs belonging to a same cell (intra-cell) are provided. The network configures or dynamically indicates a TRP to which UE initiated reports are transmitted. The UE uses the most recently indicated UL TCI state or joint TCI state for the configured or indicated TRP for the UL transmission containing the UE initiated report.

In one example, multiple (e.g., two) TRPs belonging to a same cell (intra-cell) are provided. The UE sends the UE initiated report to all (e.g., both) TRPs. The UE uses the most recently indicated UL TCI state or joint TCI state for each TRP for the transmission of the request or pre-notification.

In one example, multiple (e.g., two) TRPs belonging to a same cell (intra-cell) are provided. The UE sends the UE initiated report to all (e.g., both) TRPs. The UE uses the most recently indicated UL TCI state or joint TCI state for each TRP for the UL transmission containing the UE initiated report.

In one example, multiple TRPs belonging to a same cell (intra-cell) are provided. A UE is configured a set of TCI states associated with each TCI state. Based on the indicated TCI state(s), the UE can select one of the TCI states associated with the indicated TCI state(s) for the TRP or TRPs to which the UE initiated report is transmitted. The selected TCI state is used for the transmission of the request or pre-notification.

In one example, multiple TRPs belonging to a same cell (intra-cell) are provided. A UE is configured a set of TCI states associated with each TCI state. Based on the indicated TCI state(s), the UE can select one of the TCI states associated with the indicated TCI state(s) for the TRP or TRPs to which the UE initiated report is transmitted. The selected TCI state is used for the UL transmission containing the UE initiated report. In one example, the selected TCI state is indicated in the pre-notification or the request.

In one example, multiple TRPs belonging to a same cell (intra-cell) are provided. A same TCI state is used for the transmission of the request or pre-notification and for the UL transmission containing the UE initiated report.

In one example, multiple TRPs belonging to a same cell (intra-cell) are provided. Different TCI states are used for the transmission of the request or pre-notification and for the UL transmission containing the UE initiated report. In one example, the TCI state for the UL transmission containing the UE initiated report can be indicated in the request or pre-notification. In one example, the TRP to which the request or pre-notification is transmitted and the TRP to which the UL transmission containing the UE initiated report is transmitted are the same. In one example, the TRP to which the request or pre-notification is transmitted and the TRP to which the UL transmission containing the UE initiated report is transmitted can be different, in a further example the TRP of the UL transmission containing the UE initiated report can be indicated in the request or pre-notification.

In one example, multiple TRPs belonging to a same cell (intra-cell) are provided. A UE is configured a set of TCI states associated with each TCI state. Based on the indicated TCI state(s), the UE can select one or more of the TCI states associated with the indicated TCI state(s) including the indicated TCI state(s). The selected TCI states are used for the transmission of the request or pre-notification. The TCI states can belong to the same TRPs or different TRPs.

In one example, multiple TRPs belonging to a same cell (intra-cell) are provided. A UE is configured a set of TCI states associated with each TCI state. Based on the indicated TCI state(s), the UE can select one or more of the TCI states associated with the indicated TCI state(s) including the indicated TCI state(s). The selected TCI states are used for the UL transmission containing the UE initiated report. The TCI states can belong to the same TRPs or different TRPs. In one example, the selected TCI states are indicated in the pre-notification or the request.

In one example, multiple TRPs (e.g., a TRP can be associated with a coresetPoolIndex, or a TRP can be associated with a group of SS/PBCH Blocks) belonging to different cells (inter-cell) are provided, e.g., serving cell and other cells.

In one example, multiple TRPs belonging to different cells (inter-cell) are provided, e.g., serving cell and other cells. The UE selects a TRP of the serving cell. The UE uses the most recently indicated UL TCI state or joint TCI state for the selected TRP for the transmission of the request or pre-notification.

In one example, multiple TRPs belonging to different cells (inter-cell) are provided, e.g., serving cell and other cells. The UE selects a TRP of the serving cell. The UE uses the most recently indicated UL TCI state or joint TCI state for the selected TRP for the UL transmission containing the UE initiated report.

In one example, multiple TRPs belonging to different cells (inter-cell) are provided, e.g., serving cell and other cells. The UE selects a TRP that can be of the serving cell or a non-serving cell. The UE uses the most recently indicated UL TCI state or joint TCI state for the selected TRP for the transmission of the request or pre-notification.

In one example, multiple TRPs belonging to different cells (inter-cell) are provided, e.g., serving cell and other cells. The UE selects a TRP that can be of the serving cell or a non-serving cell. The UE uses the most recently indicated UL TCI state or joint TCI state for the selected TRP for the UL transmission containing the UE initiated report.

In one example, multiple TRPs belonging to different cells (inter-cell) are provided, e.g., serving cell and other cells. The network configures or dynamically indicates a TRP to which UE initiated reports are transmitted. In one example the TRP belongs to the serving cell. In another example, the TRP can belong to the serving cell or a non-serving cell. The UE uses the most recently indicated UL TCI state or joint TCI state for the configured or indicated TRP for the transmission of the request or pre-notification.

In one example, multiple TRPs belonging to different cells (inter-cell) are provided, e.g., serving cell and other cells. The network configures or dynamically indicates a TRP to which UE initiated reports are transmitted. In one example the TRP belongs to the serving cell. In another example, the TRP can belong to the serving cell or a non-serving cell. The UE uses the most recently indicated UL TCI state or joint TCI state for the configured or indicated TRP for the UL transmission containing the UE initiated report.

In one example, multiple (e.g., two) TRPs belonging to different cells (inter-cell) are provided, e.g., serving cell and other cells. The UE sends the UE initiated report to all (e.g., both) TRPs. The UE uses the most recently indicated UL TCI state or joint TCI state for each TRP for the transmission of the request or pre-notification.

In one example, multiple (e.g., two) TRPs belonging to different cells (inter-cell) are provided, e.g., serving cell and other cells. The UE sends the UE initiated report to all (e.g., both) TRPs. The UE uses the most recently indicated UL TCI state or joint TCI state for each TRP for the UL transmission containing the UE initiated report.

In one example, multiple TRPs belonging to different cells (inter-cell) are provided, e.g., serving cell and other cells. A UE is configured a set of TCI states associated with each TCI state. Based on the indicated TCI state(s), the UE can select one of the TCI states associated with the indicated TCI state(s) for the TRP or TRPs to which the UE initiated report is transmitted. In one example the selected TRP or TRPs belongs to the serving cell. In another example, the selected TRP or TRPs can belong to the serving cell or a non-serving cell. The selected TCI state is used for the transmission of the request or pre-notification.

In one example, multiple TRPs belonging to different cells (inter-cell) are provided, e.g., serving cell and other cells. A UE is configured a set of TCI states associated with each TCI state. Based on the indicated TCI state(s), the UE can select one of the TCI states associated with the indicated TCI state(s) for the TRP or TRPs to which the UE initiated report is transmitted. In one example the selected TRP belongs to the serving cell. In another example, the select TRP can belong to the serving cell or a non-serving cell. The selected TCI state is used for the UL transmission containing the UE initiated report. In one example, the selected TCI state is indicated in the pre-notification or the request.

In one example, multiple TRPs belonging to different cells (inter-cell) are provided, e.g., serving cell and other cells. A same TCI state is used for the transmission of the request or pre-notification and for the UL transmission containing the UE initiated report.

In one example, multiple TRPs belonging to different cells (inter-cell) are provided, e.g., serving cell and other cells. Different TCI states are used for the transmission of the request or pre-notification and for the UL transmission containing the UE initiated report. In one example, the TCI state for the UL transmission containing the UE initiated report can be indicated in the request or pre-notification. In one example, the TRP to which the request or pre-notification is transmitted and the TRP to which the UL transmission containing the UE initiated report is transmitted are the same. In one example, the TRP to which the request or pre-notification is transmitted and the TRP to which the UL transmission containing the UE initiated report is transmitted can be different, in a further example the TRP of the UL transmission containing the UE initiated report can be indicated in the request or pre-notification. In one example, the TRP to which the request or pre-notification is transmitted and the TRP to which the UL transmission containing the UE initiated report is transmitted belong to a same cell (e.g., serving cell or non-serving cell). In one example, the TRP to which the request or pre-notification is transmitted and the TRP to which the UL transmission containing the UE initiated report is transmitted can belong to different cells.

In one example, multiple TRPs belonging to different cells (inter-cell) are provided, e.g., serving cell and other cells. A UE is configured a set of TCI states associated with each TCI state. Based on the indicated TCI state(s), the UE can select one or more of the TCI states associated with the indicated TCI state(s) including the indicated TCI state(s). The selected TCI states are used for the transmission of the request or pre-notification. The TCI states can belong to the same TRPs or different TRPs. The TCI states can belong to TRPs on the same cell or to TRPs on different cells.

In one example, multiple TRPs belonging to different cells (inter-cell) are provided, e.g., serving cell and other cells. A UE is configured a set of TCI states associated with each TCI state. Based on the indicated TCI state(s), the UE can select one or more of the TCI states associated with the indicated TCI state(s) including the indicated TCI state(s). The selected TCI states are used for the UL transmission containing the UE initiated report. The TCI states can belong to the same TRPs or different TRPs. The TCI states can belong to TRPs on the same cell or to TRPs on different cells. In one example, the selected TCI states are indicated in the pre-notification or the request.

The present disclosure provides: (1) content of UE initiated report; (2) Type of UL resource for transmission of UE initiated report; (3) request and pre-notification signaling for a UE initiated report; and (4) destination and spatial relation of UL resource.

In the present disclosure, a UE initiated reporting to reduce UE reporting latency and overhead is provided.

A UE reporting is an essential aspect of any wireless communication system and especially NR. The UE provides reports to the network to assist the network in making decision related to beam management, mobility, precoding and scheduling, timing as well as other system aspects. In the present disclosure, methods and procedures for UE initiated reporting to reduce the reporting latency and overhead are provided.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
receive first information related to resources for a physical uplink shared channel (PUSCH), wherein the first information indicates a plurality of Type 1 configured grant PUSCH resource configurations,
receive second information related to (i) beam measurement resources and (ii) a beam report configuration, and
receive third information related to a condition to transmit a beam report; and
a processor operably coupled to the transceiver, the processor configured to:
measure the beam measurement resources,
determine, based on the measurement and the condition, whether to transmit the beam report,
in response to determining to transmit the beam report, determine the beam report based on the measurement, and
select one of the plurality of Type 1 configured grant PUSCH resource configurations based on at least an amount of information in the beam report or contents of the beam report,
wherein the transceiver is further configured to transmit, via a resource from the resources for the PUSCH, the beam report,
wherein the resource for the PUSCH is a Type 1 configured grant PUSCH resource corresponding to the selected Type 1 configured grant PUSCH resource configuration, and
wherein the beam report is included in uplink control information (UCI) carried in the Type 1 configured grant PUSCH resource.

2. The UE of claim 1, wherein the resource for the PUSCH is based on (i) the amount of information in the beam report or (ii) the contents of the beam report.

3. The UE of claim 1, wherein:
the transceiver is further configured to transmit a channel, before transmission of the PUSCH, indicating transmission of the beam report,
the channel is transmitted based on a transmission configuration indicator (TCI) state, and
the beam report is transmitted based on the TCI state.

4. The UE of claim 1, wherein:
the transceiver is further configured to transmit a channel, before transmission of the PUSCH, indicating transmission of the beam report, and
the channel indicates a transmission configuration indicator (TCI) state for the beam report.

5. The UE of claim 1, wherein the beam report includes N pairs of a L1 metric and an indication of an associated reference signal, where:
N>=1, and
the L1 metric is a reference signal received power (RSRP) or a signal-to-interference-plus-noise ratio (SINR) of the associated reference signal.

6. The UE of claim 1, wherein the beam report includes N×L pairs of a L1 metric and an indication of an associated reference signal, where:
L>=1 is a number of cells in the beam report,
N>=1 is a number of pairs reported per cell, and
the L1 metric is a reference signal received power (RSRP) or a signal-to-interference-plus-noise ratio (SINR) of the associated reference signal.

7. The UE of claim 1, wherein the beam report is included in a medium access control channel element (MAC CE).

8. A base station (BS), comprising:
a transceiver configured to:
transmit first information related to resources for a physical uplink shared channel (PUSCH), wherein the first information indicates a plurality of Type 1 configured grant PUSCH resource configurations,
transmit second information related to (i) beam measurement resources and (ii) a beam report configuration,
transmit third information related to a condition to transmit a beam report, and
receive, from a user equipment (UE) and via a resource from the resources for the PUSCH, a beam report, wherein the resource for the PUSCH is a Type 1 configured grant PUSCH resource corresponding to a Type 1 configured grant PUSCH resource configuration, from the plurality of Type 1 configured grant PUSCH resource configurations, selected based on at least an amount of information in the beam report or contents of the beam report; and
a processor operably coupled to the transceiver, the processor configured to:
determine whether the beam report has been received, and
when the beam report is determined to be received, configure the UE based on the beam report,
wherein the beam report is included in uplink control information (UCI) carried in the Type 1 configured grant PUSCH resource.

9. The BS of claim 8, wherein the resource for the PUSCH is based on (i) the amount of information in the beam report or (ii) the contents of the beam report.

10. The BS of claim 8, wherein:
the transceiver is further configured to receive a channel, before reception of the PUSCH, indicating reception of the beam report,
the channel is received based on a transmission configuration indicator (TCI) state, and
the beam report is received based on the TCI state.

11. The BS of claim 8, wherein:
the transceiver is further configured to receive a channel, before reception of the PUSCH, indicating transmission of the beam report, and
the channel indicates a transmission configuration indicator (TCI) state for the beam report.

12. The BS of claim 8, wherein the beam report includes N pairs of a L1 metric and an indication of an associated reference signal, where:
N>=1, and
the L1 metric is a reference signal received power (RSRP) or a signal-to-interference-plus-noise ratio (SINR) of the associated reference signal.

13. The BS of claim 8, wherein the beam report includes N×L pairs of a L1 metric and an indication of an associated reference signal, where:
L>=1 is a number of cells in the beam report,
N>=1 is a number of pairs reported per cell, and
the L1 metric is a reference signal received power (RSRP) or a signal-to-interference-plus-noise ratio (SINR) of the associated reference signal.

14. The BS of claim 8, wherein the beam report is included in a medium access control channel element (MAC CE).

15. A method of operating a user equipment (UE), the method comprising:
receiving first information related to resources for a physical uplink shared channel (PUSCH), wherein the first information indicates a plurality of Type 1 configured grant PUSCH resource configurations;
receiving second information related to (i) beam measurement resources and (ii) a beam report configuration;
receiving third information related to a condition to transmit a beam report;
measuring the beam measurement resources;
determining, based on the measurement and the condition, whether to transmit the beam report;
in response to determining to transmit the beam report, determining the beam report based on the measurement;
selecting one of the plurality of Type 1 configured grant PUSCH resource configurations based on at least an amount of information in the beam report or contents of the beam report; and
transmitting, via a resource from the resources for the PUSCH, the beam report,
wherein the resource for the PUSCH is a Type 1 configured grant PUSCH resource corresponding to the selected Type 1 configured grant PUSCH resource configuration, and
wherein the beam report is included in uplink control information (UCI) carried in the Type 1 configured grant PUSCH resource.

16. The method of claim 15, wherein the resource for the PUSCH is based on (i) the amount of information in the beam report or (ii) the contents of the beam report.

17. The method of claim 15, further comprising:
transmitting a channel, before transmission of the PUSCH, indicating transmission of the beam report, wherein:
the channel is transmitted based on a transmission configuration indicator (TCI) state, and
the beam report is transmitted based on the TCI state.

18. The method of claim 15, further comprising:
transmitting a channel, before transmission of the PUSCH, indicating transmission of the beam report,
wherein the channel indicates a transmission configuration indicator (TCI) state for the beam report.

19. The method of claim 15, wherein the beam report includes N pairs of a L1 metric and an indication of an associated reference signal, where:
N>=1, and
the L1 metric is a reference signal received power (RSRP) or a signal-to-interference-plus-noise ratio (SINR) of the associated reference signal.

20. The method of claim 15, wherein the beam report includes N×L pairs of a L1 metric and an indication of an associated reference signal, where:
L>=1 is a number of cells in the beam report,
N>=1 is a number of pairs reported per cell, and
the L1 metric is a reference signal received power (RSRP) or a signal-to-interference-plus-noise ratio (SINR) of the associated reference signal.

* * * * *